(12) United States Patent
Ishida

(10) Patent No.: US 9,328,770 B2
(45) Date of Patent: May 3, 2016

(54) CAP FOR BEARING DEVICE

(71) Applicant: UCHIYAMA MANUFACTURING CORP., Okayama-shi, Okayama (JP)

(72) Inventor: Koki Ishida, Akaiwa (JP)

(73) Assignee: UCHIYAMA MANUFACTURING CORP., Okayama (JP)

( * ) Notice: Subject to any disclaimer, the term of this patent is extended or adjusted under 35 U.S.C. 154(b) by 0 days.

(21) Appl. No.: 14/375,298

(22) PCT Filed: Jan. 24, 2013

(86) PCT No.: PCT/JP2013/051407
§ 371 (c)(1),
(2) Date: Jul. 29, 2014

(87) PCT Pub. No.: WO2013/118584
PCT Pub. Date: Aug. 15, 2013

(65) Prior Publication Data
US 2015/0010255 A1    Jan. 8, 2015

(30) Foreign Application Priority Data

Feb. 10, 2012 (JP) .................................. 2012-026886

(51) Int. Cl.
*F16C 33/72* (2006.01)
*F16C 43/04* (2006.01)
(Continued)

(52) U.S. Cl.
CPC ............... *F16C 33/723* (2013.01); *F16C 33/30* (2013.01); *F16C 33/726* (2013.01); *F16C 33/768* (2013.01); *F16C 37/007* (2013.01); *F16C 41/007* (2013.01); *F16C 43/045* (2013.01);
(Continued)

(58) Field of Classification Search
CPC ..... F16C 33/723; F16C 33/726; F16C 33/768; F16C 33/30; F16C 37/007; F16C 41/007; F16C 43/045; F16C 19/186; F16C 2326/02; B60B 27/00; B60B 27/0073
See application file for complete search history.

(56) References Cited

U.S. PATENT DOCUMENTS 3,393,015 A * 7/1968 Kaufman .................... 301/108.1
4,986,605 A * 1/1991 Descombes ................ 301/105.1
(Continued)

FOREIGN PATENT DOCUMENTS

JP          45-26492       10/1970
JP          2004-076753     3/2004
(Continued)

OTHER PUBLICATIONS

International Search Report dated Apr. 2, 2013, Application No. PCT/JP2013/051407; English Translation included.

*Primary Examiner* — Alan B Waits
(74) *Attorney, Agent, or Firm* — Rankin, Hill & Clark LLP

(57) ABSTRACT

A cap for bearing device is attached to one end portion of an outer race member in a bearing device to block an opening portion, and includes: a cylindrical part that is fitted to the outer race member; a lid part configured to block an end portion of the cylindrical part; an annular seal part configured to, when being fitted to the outer race member, be compressed between the cap for the bearing device and the outer race member; and a ventilation part, which, in the course of fitting the cylindrical part to the outer race member, allows air to pass between inside and outside of a bearing space, and in the state where the cylindrical part is fitted to the outer race member, the ventilation is shut down.

13 Claims, 15 Drawing Sheets

(51) Int. Cl.
*B60B 27/00* (2006.01)
*F16C 33/76* (2006.01)
*F16C 41/00* (2006.01)
*F16C 33/30* (2006.01)
*F16C 37/00* (2006.01)
*F16C 19/18* (2006.01)

(52) U.S. Cl.
CPC ............ *B60B27/00* (2013.01); *B60B 27/0073* (2013.01); *F16C 19/186* (2013.01); *F16C 2326/02* (2013.01)

(56) References Cited

U.S. PATENT DOCUMENTS

| 5,172,984 | A | * | 12/1992 | Lederman | 384/489 |
| 5,195,807 | A | * | 3/1993 | Lederman | 301/108.1 |
| 5,492,393 | A | * | 2/1996 | Peisker et al. | 301/108.1 |
| 5,505,525 | A | * | 4/1996 | Denton | 301/108.4 |
| 5,711,617 | A | * | 1/1998 | Scheller | 384/484 |
| 8,915,649 | B2 | * | 12/2014 | Seki et al. | 384/489 |
| 2007/0268013 | A1 | | 11/2007 | Yamamoto et al. | |
| 2008/0031561 | A1 | * | 2/2008 | Hakata et al. | 384/544 |
| 2015/0069826 | A1 | * | 3/2015 | Suzuki et al. | 301/109 |

FOREIGN PATENT DOCUMENTS

| JP | 2005-226826 | 8/2005 |
| JP | 2006-133175 | 5/2006 |
| JP | 2006-183785 | 7/2006 |
| JP | 2008-105626 | 5/2008 |
| JP | 2010-038250 | 2/2010 |
| JP | 2010-255537 | 11/2010 |
| JP | 2011-190910 | 9/2011 |

* cited by examiner (a)

(b)

CAP FOR BEARING DEVICE

TECHNICAL FIELD

The present invention relates to a bearing device, more specifically, a cap for a bearing device, the cap being attached for covering an opening portion of an outer race member on the vehicle body side in a hub bearing rotatably supporting a driven wheel of an automobile.

BACKGROUND ART

Examples of a hub bearing for driven wheel as described above are provided in Patent Literature 1, Patent Literature 2 (see FIGS. 11 and 17), and Patent Literature 3 (see FIGS. 4, 8, 12, and 15). In all of these examples, a seal ring is attached between an outer race member and an inner race member on the hub flange side (wheel mounting side). A protective cap is attached to an opening portion of the outer race member on the vehicle body side. The protective cap is formed of a cylindrical part that is fitted to an inner diameter surface of the outer race member and a lid part configured to connect to block an opening end of the cylindrical part on the vehicle body side. The protective cap covers the entire bearing space including the end portion of the inner race member on the vehicle body side. The protective cap functions to prevent entry of soil water from the vehicle body side to the bearing space or external leakage of a lubricant. In the invention of Patent Literature 1, an annular concave part exerting a labyrinth function is formed on the protective cap to prevent the sealing property of the cap from being decreased because of a gap between the outer race member and the protective cap resulting from a temperature difference between the two during operation of the bearing. In each of the hub bearings for driven wheel described in Patent Literatures 2 and 3, since an internal pressure of the bearing space fluctuates during operation of the bearing, the protective cap is provided with a means for adjusting the internal pressure.

According to other configurations described in Patent Literatures 2 and 3 and an example described in Patent Literature 4, the seal ring for sealing a bearing space between the outer race member and the inner race member is provided with an adjustment means for adjusting an internal pressure of the bearing space. In addition, according to a technique disclosed in Patent Literature 5, a groove, a through hole, a notch, or the like is formed in a cap attached to a bearing hole that supports a shaft of a throttle valve via a bearing. During pressing of the cap into the bearing hole, therefore, the cap for the bearing hole can be prevented from causing an increase in internal pressure of the sealed space.

CITATION LIST

Patent Literature

Patent Literature 1: JP-A 2004-76753
Patent Literature 2: JP-A 2005-226826
Patent Literature 3: JP-A 2011-190910
Patent Literature 4: JP-U 45-26492
Patent Literature 5: JP-A 2010-255537

SUMMARY OF INVENTION

Problems to be Solved by the Invention

In the hub bearing for driven wheel as described above, because of its structure, the attachment of the protective cap is carried out after the seal ring on the hub flange side is attached between the outer race member and the inner race member and the bearing mechanism part such as rolling elements is assembled into the bearing. Thus, when the protective cap is attached, the entire bearing space is sealed by the seal ring, the outer race member, and the protective cap. The sealed space is formed at the start of fitting the cylindrical part of the protective cap into the outer race member. In addition, the cylindrical part of the protective cap is axially long and press-fitted into the outer race member to maintain strength of a fit and sealing property with the outer race member. Thus, in the course of fitting the cylindrical part to the outer race member, the internal pressure in the entire bearing space becomes higher, and when the cylindrical part is fitted into a regular position, the internal pressure becomes significantly high. Hence, operating the bearing with a high internal pressure in the bearing space as described above adversely affects the seal ring on the hub flange side, leading to decrease in sealing property of this part. In addition, it causes an increase in rotary torque of the inner race member with respect to the outer race member, becoming a cause of an increase in fuel consumption of the vehicle. Further, the internal pressure becomes high with pressing of the protective cap, which may result in a situation where the protective cap is obliquely attached under resistance of the internal pressure. In particular, an antilock brake system (ABS) may be formed by attaching a magnetic encoder to the inner race member and setting a magnetic sensor on the outside of the protective cap to detect wheel rotation. In such a case, the obliquely attached state may decrease detection accuracy.

In the hub bearing for driven wheel disclosed in Patent Literature 1, the protective cap has a concave portion with a labyrinth function on the protective cap. It is conceived that the formation of this concave portion can suppress an increase in the internal pressure of the bearing space during the attachment of the protective cap. However, even in the state of being normally attached, there is a gap due to a labyrinth between the protective cap and the outer race member. As far as such a gap exists, soil water or the like can be hardly prevented from entering into the bearing space. In particular, if the ABS as described above is formed, the adverse effect cannot be ignored.

In the hub bearing for driven wheel illustrated in FIG. 11 of Patent Literature 2, the protective cap has a deformable member to adjust fluctuations in the internal pressure of the bearing space. However, the member is not intended to escape air from the bearing space to suppress an increase in the internal pressure during the attachment of the protective cap. In addition, in the case of attaching the protective cap with a relatively long cylindrical fitting part, the amount of compression of the bearing space by the fitting becomes large. Thus, it is considered to be difficult to absorb an increase in the internal pressure due to the compression by the illustrated deformable member. In particular, if the ABS as described above is formed, the protective cap resides between the magnetic encoder and the magnetic sensor. From this matter, it is presumed that stretch vibration of the deformable member exerts influence on the detection part and the detection accuracy thereof.

In the hub bearing for driven wheel illustrated in FIGS. 4, 8, 12, and 15 of Patent Literature 3, the protective cap has a regulator with a control member moving according to the internal pressure of the bearing space. In addition, in this case, however, the regulator is not intended to escape air from the bearing space to suppress an increase in the internal pressure during the attachment of the protective cap. In addition, the regulator is a large-scale device, and thus it cannot be denied that there is some difficulty in practical use.

None of other parts of Patent Literatures 2 and 3 and Patent Literature 4 provides any description on a protective cap that is attached to the opening portion on one end side of the outer race member. The protective caps therein are even not intended to escape air from the bearing space to suppress an increase in the internal pressure during the attachment of the protective cap. In addition, Patent Literature 5 discloses a technique for suppressing an increase in the internal pressure of the sealed space in the bearing hole of the throttle valve on pressing of the cap into the bearing hole. However, even after the attaching of the cap, the sealed space communicates with the outside by a groove, through hole, notch, or the like, and thus the ventilating state is maintained. Therefore, if this technique is applied to the protective cap to be attached to the hub bearing for driven wheel, the protective cap cannot perform its original sealing function. In the example given in FIG. 4 of Patent Literature 5, the cap has at an anterior end side thereof a notch for pressure release. However, it is considered that the notch performs the function of pressure release on the precondition that the cap has a tapered shape (see Patent Literature 5, paragraph [0011]). Specifically, it is considered that, since the cap has a tapered shape, even after attaching of the cap, the sealed space and the outside are kept in the communicating state in which ventilation is enabled from the notch through a gap resulting from the taper between the cap and the bearing hole.

The present invention is devised in light of the foregoing circumstances. An object of the present invention is to provide a novel cap for bearing device that has a simple configuration but can produce a proper sealing function without increasing the internal pressure of the bearing space on attaching of the cap to the opening portion of the outer race member.

Solutions to the Problems

A cap for a bearing device according to the present invention, the cap is attached to one axial end portion of an outer race member of the bearing device to block an opening portion of the one end portion. The cap includes: a cylindrical part that is fitted to the outer race member; a lid part configured to connect to block a posterior end portion of the cylindrical part in a fitting direction; an annular seal part configured to, when being fitted to the outer race member, intervene in a compressed state between the cap for the bearing device and the outer race member; and a ventilation part. In the course of fitting the cylindrical part to the outer race member, the ventilation part allows air to pass between inside and outside of a bearing space, and in the state where the cylindrical part is fitted to the outer race member, the ventilation of the ventilation part is shut down by the annular seal part.

The cap for bearing device in the present invention is attached to the one axial end portion of the outer race member of the bearing device to block the opening portion of the one end portion. Thus, by attaching the cap for bearing device to block the one end portion of the outer race member, the inner race member and the like to be assembled to the inside of the outer race member can be protected. In particular, if the ABS is formed by attaching a magnetic encoder for rotation detection to the inner race member and setting a magnetic sensor on the outside of the cap for bearing device, the magnetic encoder can also be protected. This makes it possible to maintain the accuracy of rotation detection over a long period of time. In the course of fitting the cap for bearing device to the outer race member, the ventilation part provides ventilation between the inside and outside of the outer race member. This makes it possible to suppress an increase in internal pressure of the bearing space. Therefore, it is possible to prevent that rotary torque of the inner race member increases with respect to the outer race member. In addition, adverse effect is less prone to exert on the seal part that intervenes between the outer race member and the inner race member on a side opposite to the section to which the cap for bearing device is attached. Further, since an increase in the internal pressure is suppressed in the course of fitting the cap for bearing device to the outer race member, the cap for bearing device is not obliquely attached. In addition, in the state where the cylindrical part is fitted to the outer race member, the annular seal part shuts down ventilation of the ventilation part. Further, the annular seal part intervenes in the compressed state between the cap for bearing device and the outer race member. Therefore, the cap for bearing device can suitably maintain its ability to seal the inside of the outer race member by the cap for bearing device.

In the cap for bearing device of the present invention, the cylindrical part may be fitted to the inner diameter surface of the outer race member or may be fitted to the outer diameter surface of the outer race member. These configurations are selected and employed as appropriate according to the specifications for the bearing device and other. When being fitted to the outer diameter surface of the outer race member, the cap for bearing device can also protect the end surface of the outer race member.

In the cap for bearing device in the present invention, the ventilation part may be formed of a through hole formed in the cylindrical part, the through hole may be positioned anterior to the annular seal part in the cylindrical part in the fitting direction, and the annular seal part may be configured to, in the state where the cylindrical part is fitted to the outer race member, intervene in the compressed state between the outer race member and the cylindrical part.

Hence, the through hole formed in the cylindrical part is positioned anterior to the annular seal part in the cylindrical part in the fitting direction thereof. Therefore, the ventilation property of the through hole is assured in the course of fitting the cylindrical part to the outer race member. In the state where the cylindrical part is fitted to the outer race member, the through hole is blocked by the fitting, and thus the ventilation with the through hole is shut down. At that time, the annular seal part intervenes in the compressed state between the outer race member and the cylindrical part, and thus sealing between the outer race member and the cylindrical part is established by the annular seal part. In addition, the through hole formed in the cylindrical part is then disposed in the annular seal part so as to be in proximity to the anterior end of the cylindrical part in the fitting direction thereof. Thus, the ventilation property of the through hole is assured until immediately before the annular seal part reaches the compressed state. Thus, an increase in the internal pressure of the bearing space can be effectively suppressed.

In the cap for bearing device in the present invention, the ventilation part may be formed of a slit-like notch extending from an anterior end portion of the cylindrical part in the fitting direction to the posterior end of the cylindrical part in the fitting direction, the notch may be positioned anterior to the annular seal part in the cylindrical part in the fitting direction thereof, and the annular seal part may be configured to, in the state where the cylindrical part is fitted to the outer race member, intervene in the compressed state between the outer race member and the cylindrical part.

Hence, the notch formed in the cylindrical part is positioned anterior to the annular seal part in the cylindrical part in the fitting direction thereof. Thus, the ventilation property by the notch is assured in the course of fitting the cylindrical part to the outer race member. In the state where the cylindrical part is fitted to the outer race member, the notch is blocked by the fitting and thus the ventilation with the notch is shut down. At that time, since the annular seal part intervenes in the compressed state between the outer race member and the cylindrical part, sealing between the outer race member and the cylindrical part is established by the annular seal part. The notch formed in the cylindrical part is then extended, in the annular seal part, to the proximity of the anterior end of the cylindrical part in the fitting direction thereof. Thus, the ventilation property of the notch is assured until immediately before cylindrical part enters the state fitted to the outer race member. The internal pressure of the bearing space can be therefore effectively suppressed from an increasing.

In the cap for bearing device in the present invention in which the cylindrical part is fitted to an inner diameter surface of the outer race member, the ventilation part may be formed of a through hole formed in the cylindrical part, a portion of the annular seal part may be fixed to an outer peripheral surface of the cylindrical part, the through hole may be formed in the annular seal part in the vicinity of the fixed portion, and the annular seal part may be configured to, in the state where the cylindrical part is fitted to the outer race member, intervene in the compressed state between the outer race member and the cylindrical part to block the through hole.

Hence, in the course of the fitting, the ventilation property is assured by the through hole until immediately before the annular seal part intervenes in the compressed state between the outer race member and the cylindrical part. In addition, in the state where the cylindrical part is fitted to the outer race member, the annular seal part intervenes in the compressed state between the outer race member and the cylindrical part, and thus sealing between the outer race member and the cylindrical part is established by the annular seal part. At that time, the annular seal part is compressed so as to block the through hole. The ventilation with the through hole is therefore shut down, and thus sealing property can also be assured at that portion.

The cap for bearing device in the present invention in which the cylindrical part is fitted to the inner diameter surface of the outer race member, the annular seal part may be fixed to the outer peripheral surface of the cylindrical part, the ventilation part may be formed of a through hole formed in the cylindrical part at a section to which the annular seal part is fixed so as to communicate with the annular seal part and the cylindrical part, and the annular seal part may be configured to, in the state where the cylindrical part is fitted to the outer race member, intervene in the compressed state between the outer race member and the cylindrical part.

Hence, in the course of fitting the cylindrical part to the outer race member, the ventilation property is assured by the through hole until immediately before the annular seal part intervenes in the compressed state between the outer race member and the cylindrical part. In addition, in the state where the cylindrical part is fitted to the outer race member, the annular seal part intervenes in the compressed state between the outer race member and the cylindrical part, and thus sealing between the outer race member and the cylindrical part is established by the annular seal part. At that time, the through hole is blocked by the fitting, and thus the ventilation of the ventilation part is shut down. Further, the annular seal part exists in the compressed state around the through hole, and thus sealing property can also be assured at the portion in which the through hole is formed.

The cap for bearing device in the present invention in which the cylindrical part is fitted to the inner diameter surface of the outer race member, an outward flange portion may be provided in the cylindrical part at a section connected to the lid part, the ventilation part may be formed of a through hole formed in the cylindrical part or the outward flange portion, the annular seal part may be fixed to a surface of the outward flange portion on the anterior end side of the cylindrical part in the fitting direction, and the annular seal part may be configured to, in the state where the cylindrical part is fitted to the outer race member, intervene in the compressed state between the end surface of the outer race member on the one end portion side and the outward flange portion.

Hence, in the course of fitting the cylindrical part to the outer race member, the ventilation property is assured by the through hole until immediately before the annular seal part intervenes in the compressed state between the end surface of the outer race member on the one end portion side and the end surface of the outward flange portion. In addition, in the state where the cylindrical part is fitted to the outer race member, the annular seal part intervenes in the compressed state between the end surface of the outer race member and the cylindrical part, and thus sealing between the outer race member and the cylindrical part is established by the annular seal part. At that time, ventilation of the ventilation part with the through hole is shut down by the annular seal part in the compressed state.

In the cap for bearing device in the present invention in which the cylindrical part is fitted to the outer diameter surface of the outer race member, the ventilation part may be formed of a through hole formed in the cylindrical part, the annular seal part may be fixed to an inner surface of the lid part, and the annular seal part may be configured to, in the state where the cylindrical part is fitted to the outer race member, intervene in the compressed state between the end surface of the outer race member on the one end portion side and the lid part.

Hence, in the course of fitting the cylindrical part to the outer race member, the ventilation property is assured by the through hole. In addition, in the state where the cylindrical part is fitted to the outer race member, the annular seal part intervenes in the compressed state between the end surface of the outer race member and the lid part, and thus sealing is established between the end surface of the outer race member and the lid part. At that time, by fitting the cylindrical part to the outer diameter surface of the outer race member, the through hole formed in the cylindrical part is blocked, and thus ventilation of the ventilation part with the through hole is also shut down. In addition, the annular seal part in the compressed state is positioned at the inner diameter side than the position of the through hole, and thus ventilation with the through hole is shut down more reliably. By forming the through hole in the cylindrical part in the vicinity of the portion connected to the lid part, the ventilation property is assured by the through hole until immediately before the cylindrical part enters the state fitted to the outer race member. Thus, an increase in the internal pressure of the bearing space can be effectively suppressed.

In the cap for bearing device in the present invention in which the cylindrical part is fitted to the outer diameter surface of the outer race member, the ventilation part may be formed of a through hole formed in the lid part, the annular seal part may be fixed to the inner surface of the lid part, the through hole may be positioned at a centrifugal side of the annular seal part, and the annular seal part is configured to, in the state where the cylindrical part is fitted to the outer race member, intervene in the compressed state between the end surface of the outer race member and the lid part.

Hence, in the course of fitting the cylindrical part to the outer race member, the ventilation property is assured by the through hole until immediately before the annular seal part intervenes in the compressed state between the end surface of the outer race member and the lid part. In addition, in the state where the cylindrical part is fitted to the outer race member, the annular seal part intervenes in the compressed state between the end surface of the outer race member and the lid part, and thus sealing between the end surface of the outer race member and the lid part is established. At that time, the through hole is positioned at the centrifugal side of the annular seal part. Thus, ventilation of the ventilation part with the through hole is also shut down.

In the cap for bearing device in the present invention in which the cylindrical part is fitted to the outer diameter surface of the outer race member, the annular seal part may be fixed to the inner surface of the lid part, the ventilation part may be formed of a through hole formed in the lid part at a section to which the annular seal part is fixed so as to communicate with the annular seal part and the lid part, and the annular seal part may be configured to, in the state where the cylindrical part is fitted to the outer race member, intervene in the compressed state between the end surface of the outer race member and the lid part.

Hence, in the course of fitting the cylindrical part to the outer race member, the ventilation property is assured by the through hole until immediately before the annular seal part intervenes in the compressed state between the end surface of the outer race member and the lid part. In addition, in the state where the cylindrical part is fitted to the outer race member, the annular seal part intervenes in the compressed state between the end surface of the outer race member and the lid part, and thus sealing between the end surface of the outer race member and the lid part is established. At that time, the annular seal part in the compressed state exists around the through hole. Therefore, ventilation of the ventilation part with the through hole is also shut down, and thus sealing property is assured by the through hole.

In the cap for bearing device in the present invention in which the cylindrical part is fitted to the outer diameter surface of the outer race member, a portion of the annular seal part may be fixed to the inner surface of the lid part, the ventilation part may be formed of a through hole formed in the lid part in the vicinity of the fixed portion of the annular seal part, and the annular seal part may be configured to, in the state where the cylindrical part is fitted to the outer race member, intervene in the compressed state between the end surface of the outer race member and the lid part to block the through hole.

Hence, in the course of fitting the cylindrical part to the outer race member, the ventilation property is assured by the through hole until immediately before the annular seal part intervenes in the compressed state between the end surface of the outer race member and the lid part. In addition, in the state where the cylindrical part is fitted to the outer race member, the annular seal part intervenes in the compressed state between the end surface of the outer race member and the lid part, and thus sealing between the end surface of the outer race member and the lid part is established. At that time, the through hole is blocked by the annular seal part. Therefore, ventilation of the ventilation part with the through hole is shut down, and thus sealing property is assured at the portion in which the through hole is formed.

Effects of the Invention

According to the cap for bearing device in the present invention, it is possible to suppress an increase in the internal pressure of the outer race member on attaching of the cap to the opening portion of the outer race member. This makes it possible to prevent increase in rotary torque of the inner race member with respect to the outer race member. In addition, this makes it less prone to exert adverse effect on the seal part intervening between the outer race member and the inner race member on the side opposite to the portion to which the cap for bearing device is attached. Further, when the cap is fitted to the outer race member, the annular seal part intervenes in a compressed state between the cap for bearing device and the outer race member. Thus, the cap for bearing device can properly perform the function of sealing the opening portion of the outer race member.

DESCRIPTION OF EMBODIMENTS

Figure 1:
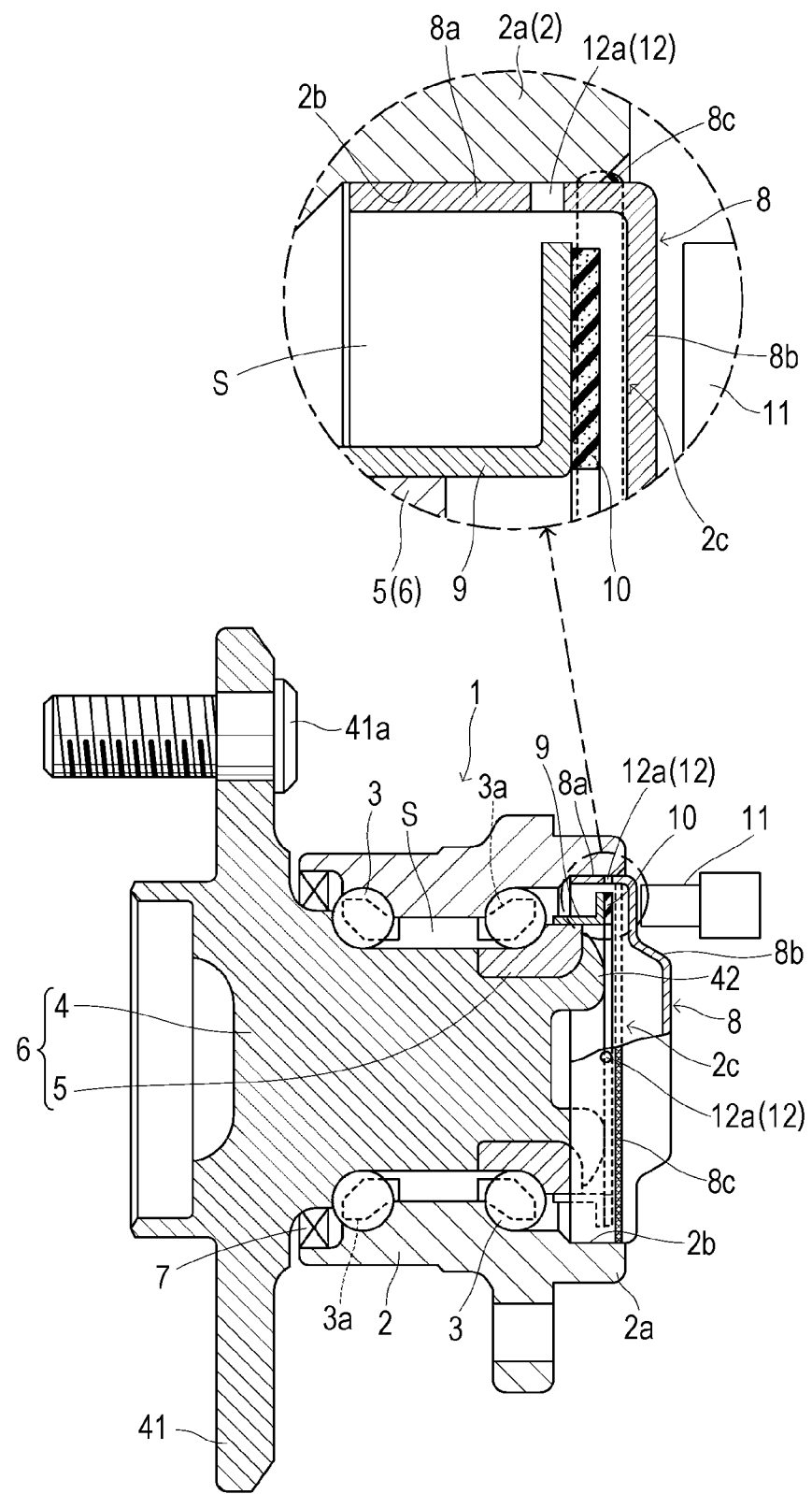
FIG. 1 is a vertical cross-sectional view of a bearing device on which a cap for bearing device according to a first embodiment of the present invention is attached, and an enlarged view of major components thereof.
Figure 2:
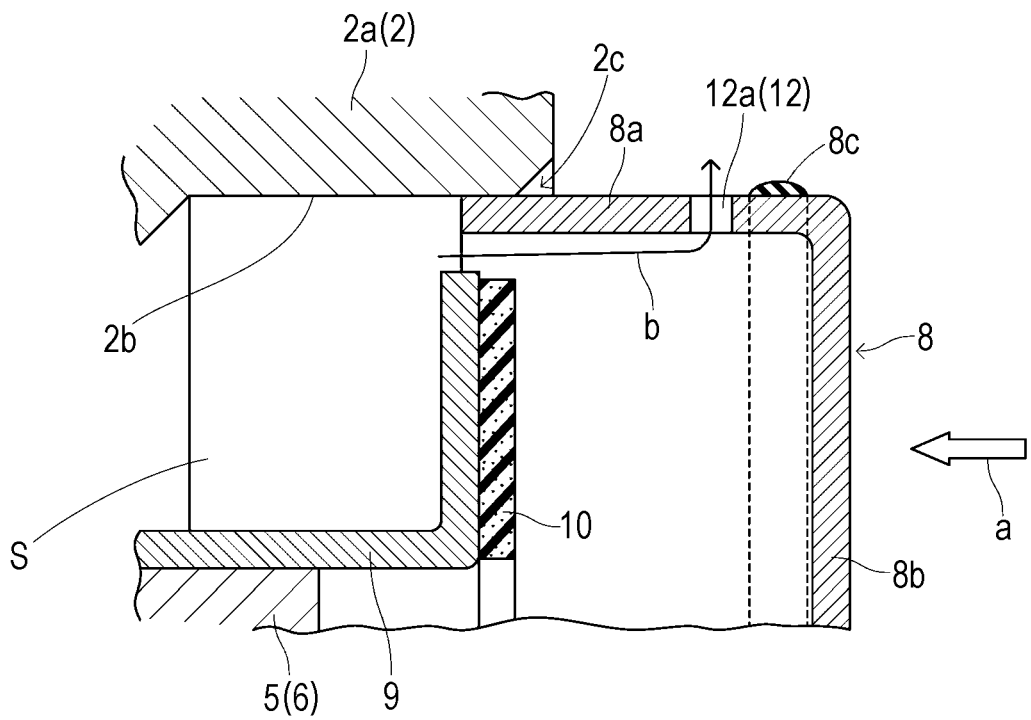
FIG. 2 is a diagram equivalent to the enlarged view of FIG. 1, illustrating the course of attaching the cap for bearing device to the bearing device.

Embodiments of the present invention will be described below with reference to the drawings. FIGS. 1 and 2 illustrate a cap for bearing device according to a first embodiment of the present invention, and FIGS. 3 to 9(b) illustrate modification examples of the first embodiment. FIG. 1 illustrates a hub bearing as one example of a bearing device on which the cap for bearing device according to the embodiment is attached, which rotatably supports a driven wheel of an automobile. In the hub bearing (bearing device) 1 in the illustrated example, a hub ring 4 and an inner race (also referred to simply as an annular member) 5 are rotatably supported around an axial center via two lines of rolling elements (balls) 3 . . . in an inner diameter portion at an outer race member 2 fixed to a vehicle body (not illustrated). The hub ring 4 has a hub flange 41. A driven wheel (tire wheel) not illustrated is attached to the hub flange 41 by a bolt 41a. The hub ring 4 and the inner race 5 constitute an inner race member 6. The rolling elements 3 . . . intervene in the state of being held by retainer 3a between the outer race member 2 and the inner race member 6. In the following description of the specification, a spatial portion between the outer race member 2 and the inner race member 6 containing the intervening portions of the rolling elements 3 . . . will be referred to as bearing space S.

A seal ring of an axial seal type (dust seal) 7 is attached slidably with respect to the inner race member 6 (hub ring 4) between the outer race member 2 and the inner race member 6 at an end portion of the bearing space S on the wheel side. In addition, a cap for bearing device (hereinafter, referred to as protective cap) 8 is attached by fitting to an inner diameter surface 2b of an end portion (one axial end portion) 2a of the outer race member 2 on the vehicle body side. An opening portion 2c of the end portion 2a on the vehicle body side is blocked by the protective cap 8. The bearing space S is charged with a lubricant (for example, grease) not illustrated. This allows smooth rolling of the rolling elements 3 . . . . The seal ring 7 and the protective cap 8 function to prevent external leakage of the lubricant and entry of soil water, dust, and the like from the outside to the bearing space S. A support ring 9 with an L-shaped cross section is integrally fitted and attached to the outer diameter surface of the inner race 5. An annular magnetic encoder 10 is fixed to a surface of the support ring 9 on the vehicle body side. In addition, a magnetic sensor 11 is set in the vehicle body on the outside of the protective cap 8 and at a position opposed to the magnetic encoder 10. The magnetic encoder 10 and the magnetic sensor 11 constitute the ABS to detect wheel rotation. The magnetic encoder 10 in the illustrated example is integrally formed on the support ring 9 by a rubber material blended with magnetic powder. Along a circumferential direction of the magnetic encoder 10, a large number of N poles and S poles are alternately magnetized. The magnetic sensor 11 detects magnetic changes resulting from rotation of the magnetic encoder 10. The protective cap 8 is positioned at an air-gap portion between the magnetic encoder 10 and the magnetic sensor 11. Thus, the protective cap 8 is produced by a non-magnetic material (for example, SUS304 or synthetic resin) such that a magnetic flux emitted from the magnetic encoder 10 can pass through the protective cap 8.

The procedure for assembling the thus configured hub bearing 1 will be briefly described. First, the rolling elements 3 are held via the retainer 3a on a track surface of the outer race member 2 on the wheel side. Then, while the seal ring 7 is integrally fitted to the inner diameter surface of the end portion on the wheel side, the outer race member 2 is fitted and attached to the hub ring 4 from the end portion of the hub ring 4 on the vehicle body side. Then, the rolling elements 3 are held via the retainer 3a on the track surface of the inner race 5 on the vehicle body side. In this state, the inner race 5 is externally fitted to the end portion of the hub ring 4 on the vehicle body side. Then, by extending and opening the end portion of the hub ring 4 on the vehicle body side, the end portion is swaged to the end surface of the inner race 5 on the vehicle body side. The swaged portion 42 makes it possible to position the inner race member (hub race 4 and inner race 5) 6, rolling elements 3 . . . , and seal ring 7 into predetermined positions with respect to the outer race member 2. Further, the support ring 9 integrally having the magnetic encoder 10 is integrally fitted and attached to the outer diameter surface of the inner race 5 on the vehicle body side. In this state, the protective cap 8 is attached to the inner diameter surface 2b of the end portion 2a of the outer race member 2 on the vehicle body side. This blocks the opening portion 2c of the end portion 2a on the vehicle body side. The thus assembled hub bearing 1 is attached via the outer race member 2 to the vehicle body at a predetermined position. In this attached state, the magnetic encoder 10 is disposed at a position opposed to the magnetic sensor set on the vehicle body.

The protective cap 8 includes a cylindrical part 8a and a lid part 8b. The cylindrical part 8a is integrally fitted to the inner diameter surface 2b of the end portion 2a of the outer race member 2 on the vehicle body side. The lid part 8b is connected to block the posterior end portion of the cylindrical part 8a in a fitting direction thereof (see hollow arrow a in FIG. 2). The protective cap 8 also includes an annular seal part 8c. The annular seal part 8c is made of a rubber material fixed to an outer peripheral surface of the cylindrical part 8a so as to intervene in a compressed state between the outer race member 2 and the cylindrical part 8a when being fitted to the inner diameter surface 2b of the outer race member 2. The end portion of the bearing space S formed by the outer race member 2 and the inner race member 6 assembled as described above on the wheel side is sealed by the seal ring 7. Therefore, when the protective cap 8 is fitted to the inner diameter surface 2b via the cylindrical part 8a in this state, the bearing space S becomes a sealed space at the initial stage of the fitting. Thus, the internal pressure of the bearing space S increases together with the fitting. Therefore, the protective cap 8 of the embodiment has in the cylindrical part 8a through holes 12a as ventilation parts 12 to suppress an increase in the internal pressure.

The thus configured protective cap 8 will be described in more detail with reference to FIG. 2. The annular seal part 8c is fixed to the outer peripheral surface of the cylindrical part 8a in the vicinity of a section connected to the lid part 8b. The annular seal part 8c is made of a rubber material, and is integrally formed by vulcanized molding at the portion of the cylindrical part 8a. In addition, a plurality of (for example, four at 90° each) through holes 12a is circumferentially formed at almost equal intervals at a position anterior to the annular seal part 8c in the cylindrical part 8a in the direction (direction a) of fitting the cylindrical part 8a to the outer race member 2 and in the vicinity of the annular seal part 8c. When being made of metal, the protective cap 8 is produced as described below. The through holes are made by punching at predetermined positions of an original circular metal plate. An original body including a cylindrical part and a lid part is produced by a drawing process. Then, the original body is placed in a metal mold with a predetermined shape and a non-vulcanized rubber material is injected into the metal mold for vulcanized molding. As illustrated in FIG. 2, using a jig (not shown), the protective cap 8 is attached to the outer race member 2 by pressing the cylindrical part 8a into the inner tubular portion of the outer race member 2 and integrally fitting the cylindrical part 8a to the inner diameter surface 2b in the fitting direction (direction a). Therefore, the opening portion 2c of the end portion 2a on the vehicle body side is closed. Thus, in the course of fitting the cylindrical part 8a to the outer race member 2, a portion of air in the bearing space S is discharged to the outside via the through holes 12a as indicated by arrow b.

The cylindrical part 8a needs to be relatively long to surely provide a fitting force with respect to the outer race member 2. Thus, if an attempt is made to fit the protective cap 8 without through holes 12a to the position as illustrated in FIG. 1, a large volume of air almost equivalent to the length of the cylindrical part 8a in the bearing space S is compressed. Therefore, the internal pressure of the bearing space S increases, and the internal pressure exerts adverse effect on the seal ring 7 such as deformation. In the embodiment, however, the through holes 12a are made as the ventilation parts 12 in the cylindrical part 8a. Thus, in the course of the fitting, a portion of air in the bearing space S is discharged to the outside via the through holes 12a. This suppresses an increase in the internal pressure of the bearing space S. In addition, the through holes 12a are formed in the vicinity of the anterior end of the cylindrical part 8a so as to be anterior to the fixed portion of the annular seal part 8c in the fitting direction (direction a). Thus, ventilation is surely provided by the through holes 12a until immediately before the annular seal part 8c reaches the predetermined fitting state (see FIG. 1) where the annular seal part 8c intervenes in the compressed state between the cylindrical part 8a and the outer race member 2. Therefore, a large volume of air equivalent to the length of the cylindrical part 8a is discharged without being compressed. As compared to the case without the through holes 12a, an increase in the internal pressure of the bearing space S becomes excessively small. Therefore, there is no fear of increase in rotary torque of the inner race member 6 due to an increase in the internal pressure. In addition, no adverse influence occurs on the seal ring 7 due to an increase in the internal pressure. Further, there is no fear that the protective cap 8 is obliquely attached under resistance of the internal pressure. In the state where the cylindrical part 8a is fitted to the outer race member 2, the through holes 12a are blocked by the inner diameter surface 2b of the outer race member 2. Thus, ventilation of the ventilation parts 12 with the through holes 12a is shut down. In addition, in the state where the cylindrical part 8a is fitted to the outer race member 2, the annular seal part 8c intervenes in the compressed state between the cylindrical part 8a and the inner diameter surface 2b. Therefore, sealing is established between the cylindrical part 8a and the inner diameter surface 2b. This makes it possible to prevent entry of soil water or the like from the outside to the bearing space S and external leakage of the lubricant. In addition, it is possible to prevent damage to the magnetic encoder 10 and the like, thereby to maintain the accuracy of detection of rotation. The attachment of the protective cap 8 to the outer race member 2 is performed by fitting together the metal portions in the illustrated example. Thus, if the annular seal part 8c does not exist, the sealing function of the fitting portion is not sufficient. Therefore, the annular seal part 8c as illustrated in the drawing is needed. A portion of the annular seal part 8c marked by a two-dot chain line in the enlarged view of FIG. 1, represents an original shape prior to the compression.

In this example, the annular seal part 8c may be formed so as to be disposed slightly anterior to one illustrated in the drawing in the fitting direction (direction a) to dispose the annular seal part 8c so as to detour the posterior end of the through holes 12a in the fitting direction (direction a).

Figure 3:
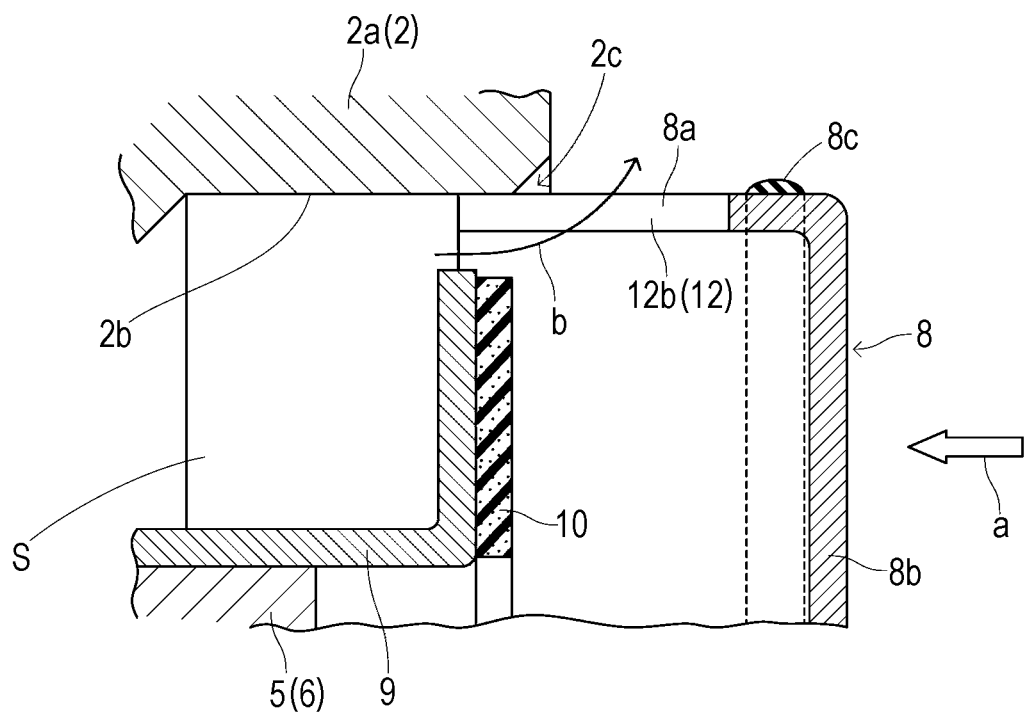
FIG. 3 is a diagram similar to FIG. 2, illustrating a modification example of the cap for bearing device in the same embodiment.
Figure 4:
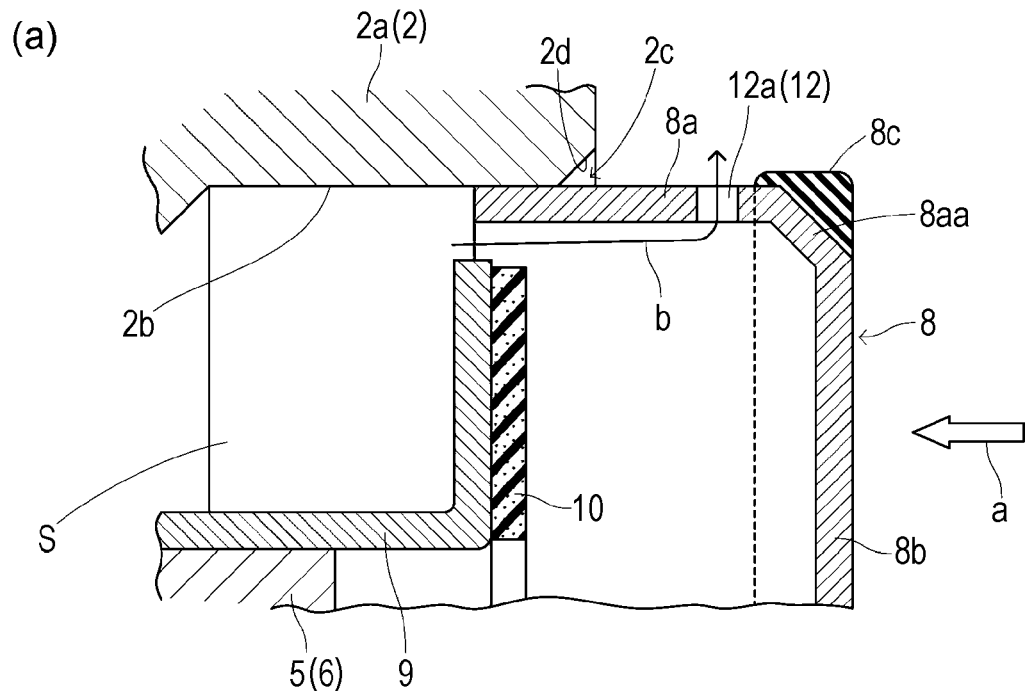
FIG. 4($a$) is a diagram similar to FIG. 2 in another modification example of the cap for bearing device in the same embodiment, and FIG. 4($b$) is a diagram equivalent to the enlarged view of FIG. 1, illustrating the state where the cap for bearing device in the modification example is attached to a bearing device.
Figure 4:
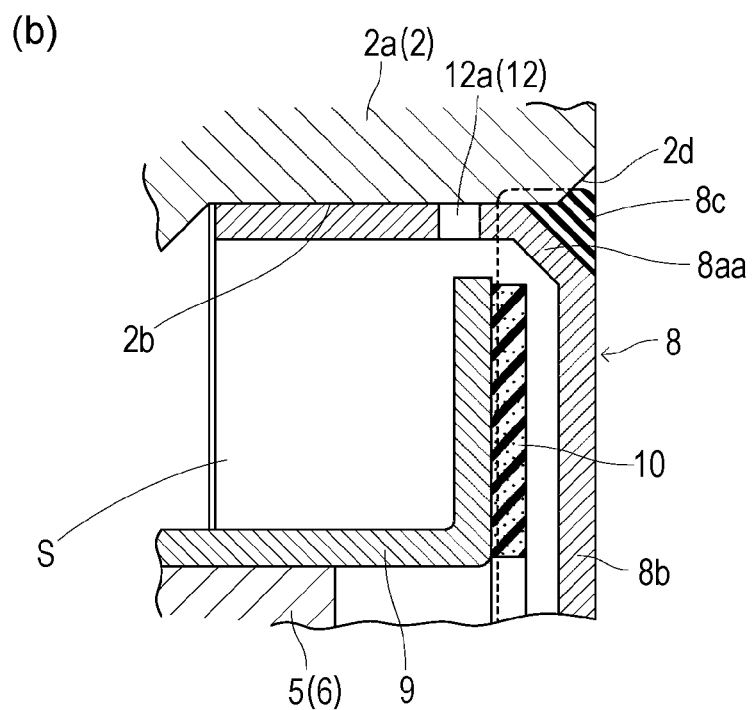

FIG. 3 illustrates a modification example of the first embodiment. In this example, the protective cap 8 includes the cylindrical part 8a and the lid part 8b as in the foregoing example. The cylindrical part 8a is integrally fitted to the inner diameter surface 2b of the end portion 2a of the outer race member 2 on the vehicle body side. The lid part 8b is connected to block the posterior end portion of cylindrical part 8a in the fitting direction (direction of hollow arrow a). The annular seal part 8c is fixed to the cylindrical part 8a in the vicinity of the section connected to the lid part 8b. The ventilation parts 12 are formed of slit-like notches 12b. The notches 12b are formed so as to extend from the anterior end portion of the cylindrical part 8a in the fitting direction (direction a) to the posterior end of the cylindrical part 8a in the fitting direction (direction a), which is different from the foregoing example. A plurality of (for example, four) notches 12b is formed at almost equal intervals in the circumferential direction. Each of the notches 12b extends to the vicinity of the annular seal part 8c.

The protective cap 8 in this example is, as illustrated in FIG. 3, attached to the outer race member 2 to block the opening portion 2c of the end portion 2a on the vehicle body side by integrally fitting the cylindrical part 8a to the inner diameter surface 2b of the outer race member 2 along the direction of hollow arrow a. In the course of fitting the cylindrical part 8a to the outer race member 2, a portion of air in the bearing space S is discharged to the outside via the notches 12b as indicated by arrow b. Therefore, in the course of fitting the cylindrical part 8a to the outer race member 2, an increase in the internal pressure of the bearing space S is suppressed to produce the same advantage as that in the foregoing example. In addition, the notches 12b are extended to the vicinity of the annular seal part 8c. Thus, ventilation is assured by the notches 12b until immediately before the annular seal part 8c reaches the state where the annular seal part 8c intervenes in the compressed state between the cylindrical part 8a and the outer race member 2 (see FIG. 1). Therefore, as compared to the case without the notches 12b, a virtual increase in the internal pressure of the bearing space S becomes very small. In addition, in the state where the cylindrical part 8a is fitted to the outer race member 2, the notches 12b are blocked by the inner diameter surface 2b of the outer race member 2. Thus, ventilation in and by the notches 12b is shut down. In addition, in the state where the cylindrical part 8a is fitted to the outer race member 2, the annular seal part 8c intervenes in the compressed state between the cylindrical part 8a and the inner diameter surface 2b, as in the foregoing example. Thus, sealing is established between the cylindrical part 8a and the inner diameter surface 2b. This makes it possible to prevent entry of soil water or the like from the outside to the bearing space S and external leakage of the lubricant. In addition, it is possible to prevent damage to the magnetic encoder 10 and the like, thereby to maintain the accuracy of detection of rotation.

FIGS. 4(a) and 4(b) illustrate another modification example of the first embodiment. In this example, the protective cap 8 includes the cylindrical part 8a and the lid part 8b as in the foregoing example. The cylindrical part 8a is integrally fitted to the inner diameter surface 2b of the end portion 2a of the outer race member 2 on the vehicle body side. The lid part 8b is connected to block the posterior end portion of cylindrical part 8a in the fitting direction (see hollow arrow a in FIG. 2). Meanwhile, the portion of the cylindrical part 8a connected to the lid part 8b includes a tapered portion 8aa that reduces in diameter on the lid part 8b side. Further, the annular seal part 8c is fixed to the outer peripheral surface of the posterior end portion of the cylindrical part 8a including the tapered portion 8aa, which is different from the examples illustrated in FIGS. 1 and 2. In addition, a plurality of through holes 12a as ventilation parts 12 is circumferentially formed at almost equal intervals in the vicinity of the anterior end of cylindrical part 8a in the fitting direction (direction a) so as to be anterior to the annular seal part 8c.

The protective cap 8 in this example is, as illustrated in FIG. 4(a), attached to the outer race member 2 so as to block the opening portion 2c of the end portion 2a on the vehicle body side by integrally fitting the cylindrical part 8a to the inner diameter surface 2b of the outer race member 2 along the direction of hollow arrow a. In the course of fitting the cylindrical part 8a to the outer race member 2, a portion of air in the bearing space S is discharged to the outside through the through holes 12a as indicated by arrow b. Therefore, in the course of fitting the cylindrical part 8a to the outer race member 2, an increase in the internal pressure of the bearing space S is suppressed to produce the same advantage as described above. In addition, the through holes 12a are formed in the annular seal part 8c in the vicinity of the anterior end thereof in the fitting direction (direction a). Thus, ventilation is assured by the through holes 12a until immediately before the annular seal part 8c reaches the predetermined fitting state (see FIG. 4(b)) where the annular seal part 8c intervenes between the cylindrical part 8a and the outer race member 2. Therefore, as compared to the case without the through holes 12a, a virtual increase in the internal pressure of the bearing space S becomes very small as in the foregoing example. In addition, in the state where the cylindrical part 8a is fitted to the outer race member 2, the through holes 12a are blocked by the inner diameter surface 2b of the outer race member 2. Thus, ventilation with the through holes 12a is shut down. Further, in the state where the cylindrical part 8a is fitted to the outer race member 2, the annular seal part 8c intervenes in the compressed state between the cylindrical part 8a and the inner diameter surface 2b, as in the foregoing example. Thus, sealing is established between the cylindrical part 8a and the inner diameter surface 2b. This makes it possible to prevent entry of soil water or the like from the outside to the bearing space S and external leakage of the lubricant. In addition, it is possible to prevent damage to the magnetic encoder 10 and the like, thereby to maintain the accuracy of detection of rotation. In particular, the annular seal part 8c is fixed to the outer peripheral surface of the posterior end portion of the cylindrical part 8a including the tapered portion 8aa. Thus, in the course of compressing the annular seal part 8c, a relatively large escape portion for the rubber material is surely provided between the tapered portion 8aa and a chamfered corner part 2d of the outer race member 2 on the inner diameter side of the end portion 2a on the vehicle body side. Therefore, the compression is smoothly performed with a small resistance. Further, when a portion of the annular seal part 8c exists at the escape portion, sealing property between the cylindrical part 8a and the inner diameter surface 2b further improves.

In this example, instead of the through holes 12a, the ventilation parts 12 may be notches 12b as illustrated in FIG. 3.

FIGS. 5(a) and 5(b) illustrate still another modification example of the first embodiment. In this example, the protective cap 8 includes the cylindrical part 8a and the lid part 8b as in the foregoing example. The cylindrical part 8a is integrally fitted to the inner diameter surface 2b of the end portion 2a of the outer race member 2 on the vehicle body side. The lid part 8b is connected to block the posterior end portion of cylindrical part 8a in the fitting direction (see hollow arrow a in FIG. 2). In addition, this example is the same as the examples illustrated in FIGS. 1, 2, and 4 in that the ventilation parts 12 are formed of through holes 12a in the cylindrical part 8a. However, a portion of the annular seal part 8c on the anterior end thereof in the fitting direction (direction a) is fixed to the outer peripheral surface of the cylindrical part 8a. The through holes 12a are formed in the vicinity of the posterior end thereof in the fitting direction (direction a) so as to be posterior to the fixed portion of the annular seal part 8c. In the foregoing points, this example is different from the other examples. In this example, in the state where the cylindrical part 8a is fitted to the outer race member 2, the annular seal part 8c is configured to intervene in the compressed state between the outer race member 2 and the cylindrical part 8a to block the through holes 12a. The annular seal part 8c is fixed to the cylindrical part 8a at a position in the vicinity of the lid part 8b. Before the cylindrical part 8a is fitted to the outer race member 2 and the annular seal part 8c is compressed, the annular seal part 8c is configured to cover the opening portions of the through holes 12a but leave a gap for ventilation, as illustrated in FIG. 5(a). Alternatively, the annular seal part 8c may be formed such that the annular seal part 8c covers and blocks the opening portions of the through holes 12a and, in the course of fitting the cylindrical part 8a to the outer race member 2, if the internal pressure of the bearing space S increases, the annular seal part 8c elastically deforms to open the opening portions of the through holes 12a for provision of ventilation in the same manner.

Figure 5:
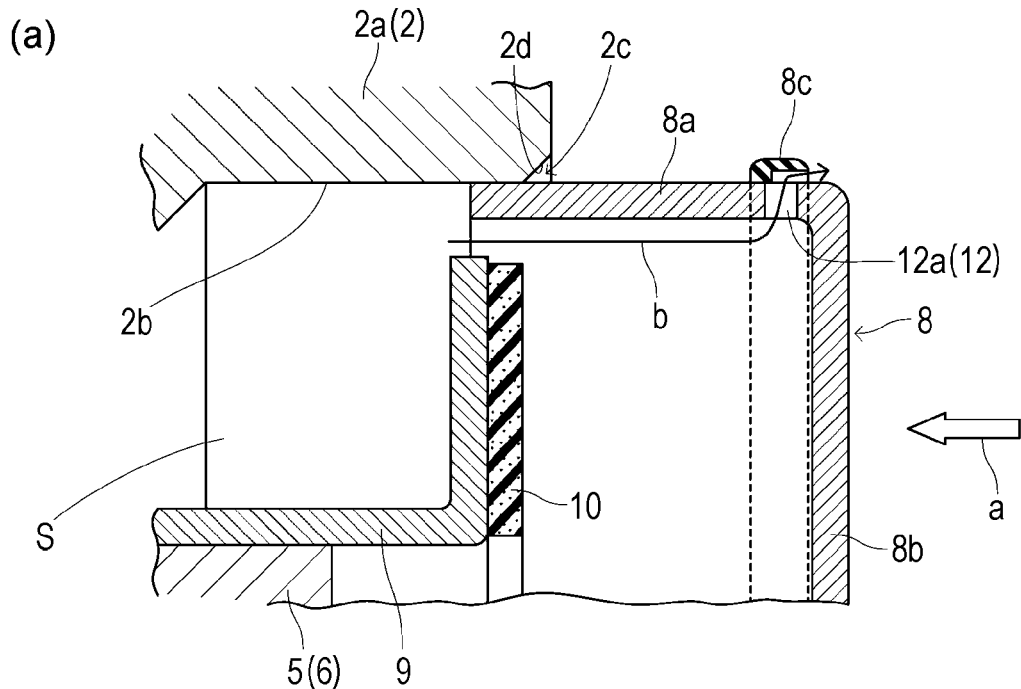
FIG. 5($a$) is a diagram similar to FIG. 2 in still another modification example of the cap for bearing device in the same embodiment, and FIG. 5($b$) is a diagram equivalent to the enlarged view of FIG. 1, illustrating the state where the cap for bearing device in the modification example is attached to a bearing device.
Figure 5:
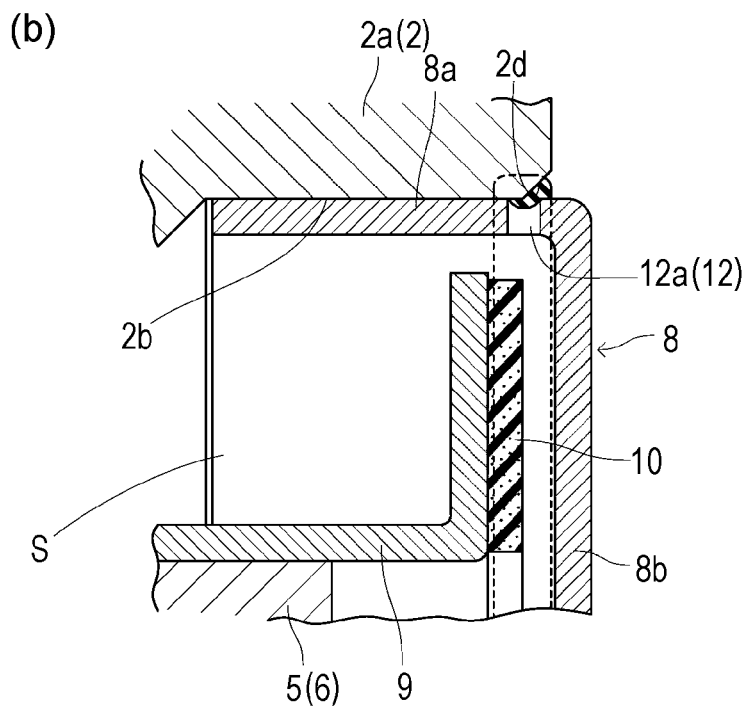

The protective cap 8 in this example is, as illustrated in FIG. 5(*a*), attached to the outer race member 2 so as to block the opening portion 2*c* of the end portion 2*a* on the vehicle body side by integrally fitting the cylindrical part 8*a* to the inner diameter surface 2*b* of the outer race member 2 along the direction of hollow arrow a. In the course of fitting the cylindrical part 8*a* to the outer race member 2, a portion of air in the bearing space S is discharged to the outside through the through holes 12*a* as indicated by arrow b. Therefore, in the course of fitting the cylindrical part 8*a* to the outer race member 2, an increase in the internal pressure of the bearing space S is suppressed to produce the same advantage as in the foregoing example. In addition, the through holes 12*a* are formed in the fixed portion of the annular seal part 8*c* in the vicinity of the posterior end thereof in the fitting direction (direction a) so as to be posterior to the fixed portion of the annular seal part 8*c*. Thus, ventilation is assured by the through holes 12*a* until immediately before the annular seal part 8*c* reaches the predetermined fitting state (see FIG. 5(*b*)) where the annular seal part 8*c* intervenes between the cylindrical part 8*a* and the outer race member 2. In addition, in the state where the cylindrical part 8*a* is fitted to the outer race member 2, the through holes 12*a* are blocked by the elastically deformed annular seal part 8*c*. Thus, ventilation with the through holes 12*a* is shut down. Further, in the state where the cylindrical part 8*a* is fitted to the outer race member 2, the annular seal part 8*c* intervenes in the compressed state between the cylindrical part 8*a* and the inner diameter surface 2*b* as in the foregoing examples. Thus, sealing is established between the cylindrical part 8*a* and the inner diameter surface 2*b*. This makes it possible to prevent entry of soil water or the like from the outside to the bearing space S and external leakage of the lubricant. In addition, it is possible to prevent damage to the magnetic encoder 10 and the like, thereby to maintain the accuracy of detection of rotation. In the illustrated example, in the state where the cylindrical part 8*a* is fitted to the outer race member 2, the through holes 12*a* are opposed to the chamfered corner part 2*d* on the inner diameter side of the outer race member 2. The through holes 12*a* are blocked by the elastically deformed annular seal part 8*c*. Therefore, the ventilation with the through holes 12*a* is shut down. Further, there occurs no situation that soil water or the like enters the bearing space S or the lubricant leaks from the bearing space S through the through holes 12*a*.

Figure 6:
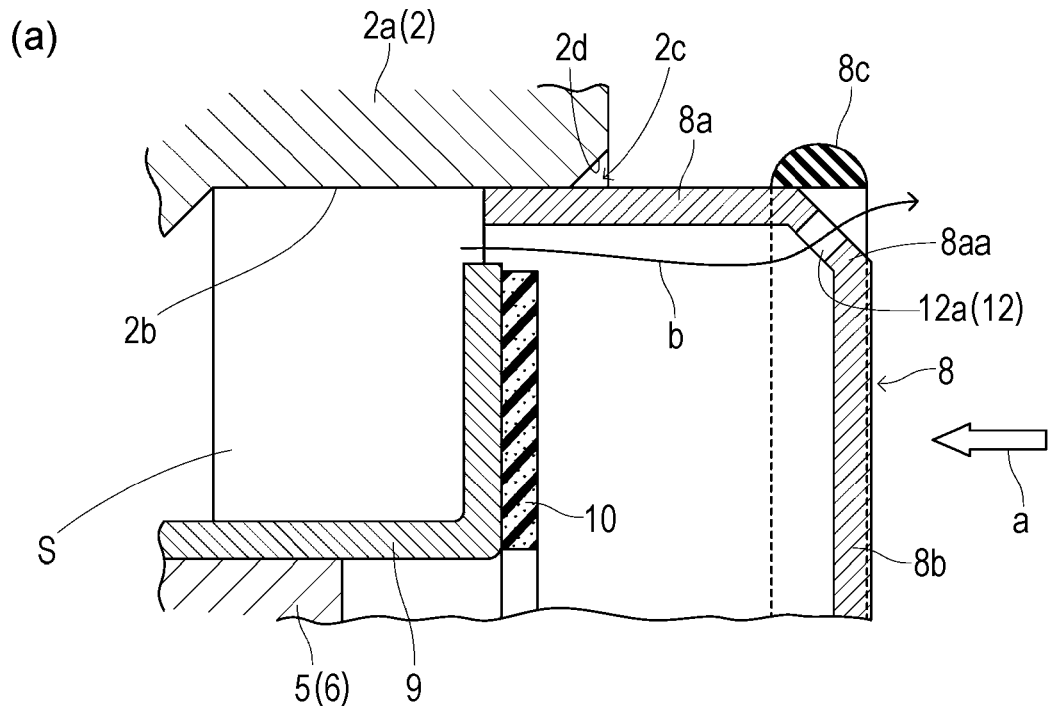
FIG. 6($a$) is a diagram similar to FIG. 2 in still another modification example of the cap for bearing device in the same embodiment, and FIG. 6($b$) is a diagram equivalent to the enlarged view of FIG. 1, illustrating the state where the cap for bearing device in the modification example is attached to a bearing device.
Figure 6:
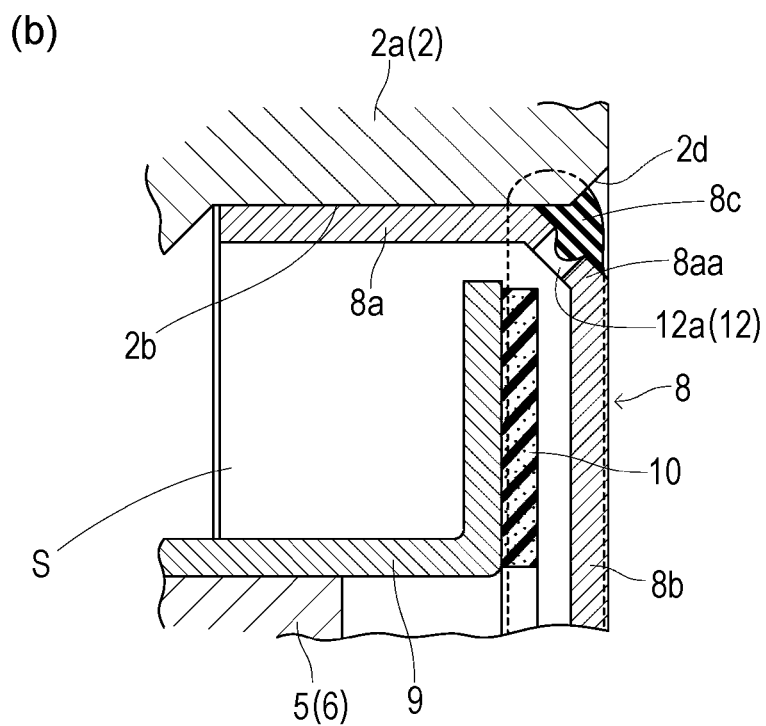

FIGS. 6(*a*) and 6(*b*) illustrate still another modification example of the first embodiment. This example can be said to be almost equal to a combination of the examples of FIGS. 4(*a*) and 4(*b*) and FIGS. 5(*a*) and 5(*b*). Specifically, as in the example of FIG. 4, the protective cap 8 includes the tapered portion 8*aa* at the portion of the cylindrical part 8*a* connected to the lid part 8*b*. The through holes 12*a* are formed in the tapered portion 8*aa*. In addition, a portion of the annular seal part 8*c* on the anterior end thereof in the fitting direction (direction a) is fixed to the cylindrical part 8*a* on the outer peripheral surface of a formation base portion for the tapered portion 8*aa*. The annular seal part 8*c* is configured to extend from the fixed portion to the posterior end in the fitting direction (direction a). In the case of this example, in the course of fitting the cylindrical part 8*a* to the outer race member 2, the annular seal part 8*c* is compressed between the outer race member 2 and the cylindrical part 8*a*. Further, the annular seal part 8*c* is configured to elastically deform to a centripetal side to block the through holes 12*a* under action of the chamfered corner part 2*d* of the outer race member 2 on the inner diameter side.

The protective cap 8 in this example is, as illustrated in FIG. 6(*a*), attached to the outer race member 2 so as to block the opening portion 2*c* of the end portion 2*a* on the vehicle body side by integrally fitting the cylindrical part 8*a* to the inner diameter surface 2*b* of the outer race member 2 along the direction of hollow arrow a. In the course of fitting the cylindrical part 8*a* to the outer race member 2, a portion of air in the bearing space S is discharged to the outside through the through holes 12*a* as indicated by arrow b. Therefore, in the course of fitting the cylindrical part 8*a* to the outer race member 2, an increase in the internal pressure of the bearing space S is suppressed to produce the same advantage as in the foregoing example. In addition, the through holes 12*a* are formed in the tapered portion 8*aa*. Thus, ventilation is assured by the through holes 12*a* until immediately before the annular seal part 8*c* reaches the predetermined fitting state (see FIG. 6(*b*)) where the annular seal part 8*c* intervenes between the cylindrical part 8*a* and the outer race member 2. In addition, when the cylindrical part 8*a* is fitted to the outer race member 2, the through holes 12*a* are blocked by the elastically deformed annular seal part 8*c*. Thus, the ventilation with the through holes 12*a* is shut down. Further, in the state where the cylindrical part 8*a* is fitted to the outer race member 2, the annular seal part 8*c* intervenes in the compressed state between the cylindrical part 8*a* and the inner diameter surface 2*b* as in the foregoing examples. Thus, sealing is established between the cylindrical part 8*a* and the inner diameter surface 2*b*. This makes it possible to prevent entry of soil water or the like from the outside to the bearing space S and external leakage of the lubricant. In addition, it is possible to prevent damage to the magnetic encoder 10 and the like, thereby to maintain the accuracy of detection of rotation. In particular, the annular seal part 8*c* is fixed to the outer peripheral surface of the back end portion of the cylindrical part 8*a* connected to the tapered portion 8*aa* (formation base portion for the tapered portion 8*aa*). Thus, in the course of compressing the annular seal part 8*c*, a relatively large escape portion for the rubber material is surely provided between the tapered portion 8*aa* and the chamfered corner part 2*d* of the outer race member 2 on the inner diameter side of the end portion 2*a* on the vehicle body side. Therefore, the compression is smoothly performed with a small resistance, as in the example of FIGS. 4(*a*) and (*b*). Further, when a portion of the annular seal part 8*c* exists at the escape portion, sealing property between the cylindrical part 8*a* and the inner diameter surface 2*b* further improves.

In addition, in the examples illustrated in FIGS. 5(*a*) and 5(*b*) and FIGS. 6(*a*) and 6(*b*), a portion of the annular seal part 8*c* on the anterior end thereof in the fitting direction (direction a) is fixed to the cylindrical part 8*a*. However, the annular seal part 8*c* is not limited to this but a portion of the annular seal part 8*c* may be fixed to any portion around the through holes 12*a*.

Figure 7:
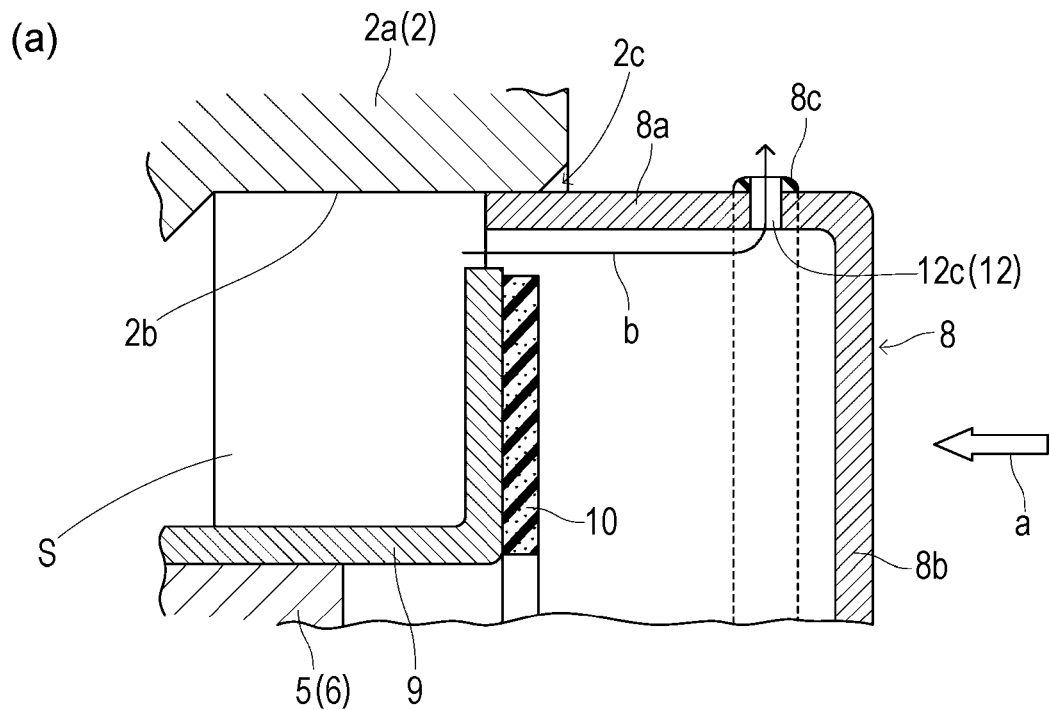
FIG. 7($a$) is a diagram similar to FIG. 2 in still another modification example of the cap for bearing device in the same embodiment, and FIG. 7($b$) is a diagram equivalent to the enlarged view of FIG. 1, illustrating the state where the cap for bearing device in the modification example is attached to a bearing device.
Figure 7:
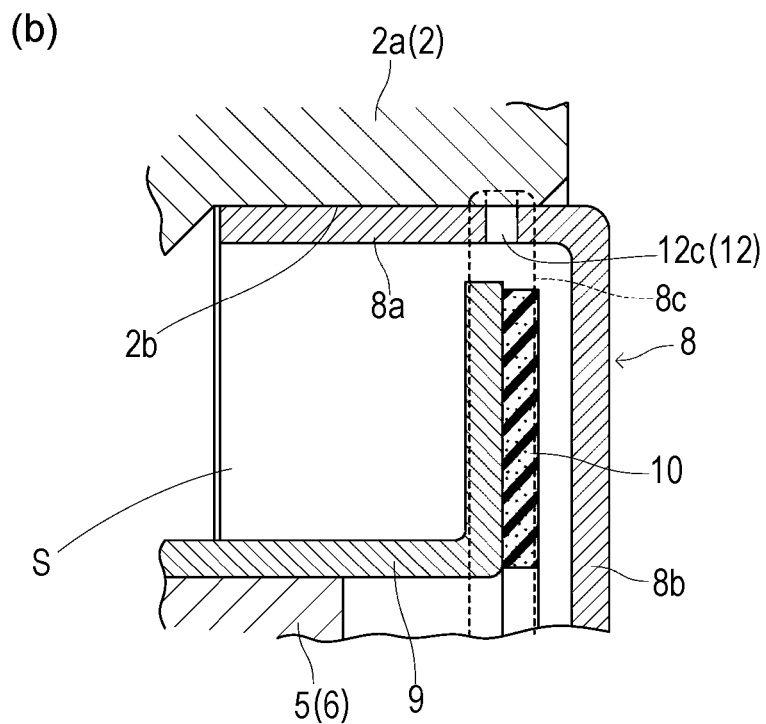
Figure 8:
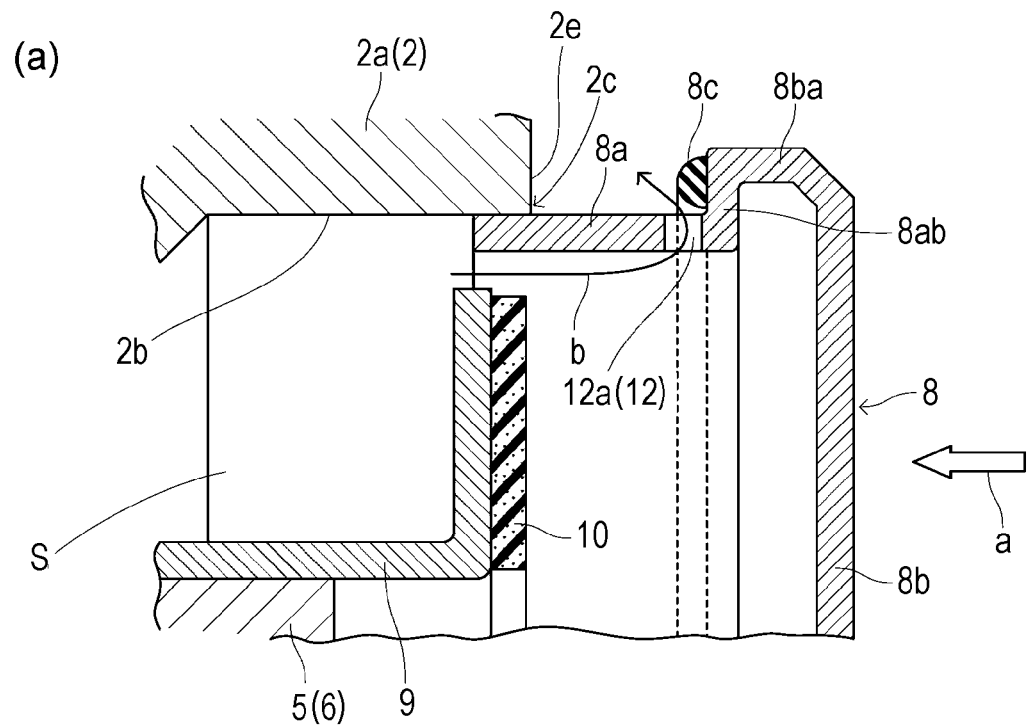
FIG. 8($a$) is a diagram similar to FIG. 2 in still another modification example of the cap for bearing device in the same embodiment, and FIG. 8($b$) is a diagram equivalent to the enlarged view of FIG. 1, illustrating the state where the cap for bearing device in the modification example is attached to a bearing device.
Figure 8:
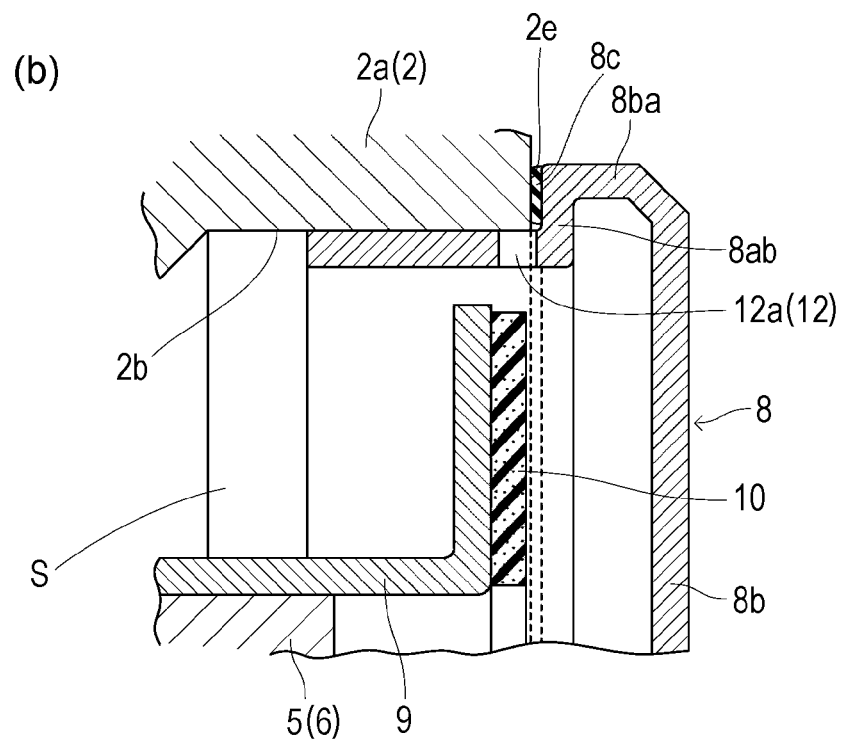
Figure 9:
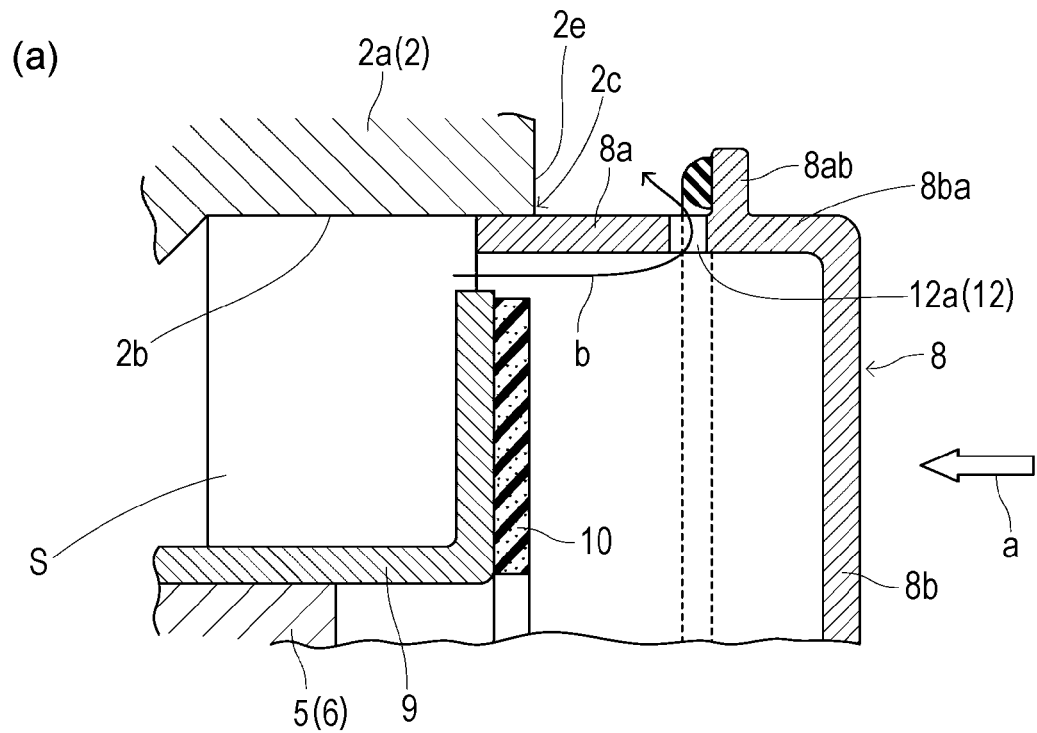
FIG. 9($a$) is a diagram similar to FIG. 2 in still another modification example of the cap for bearing device in the same embodiment, and FIG. 9($b$) is a diagram equivalent to the enlarged view of FIG. 1, illustrating the state where the cap for bearing device in the modification example is attached to a bearing device.
Figure 9:
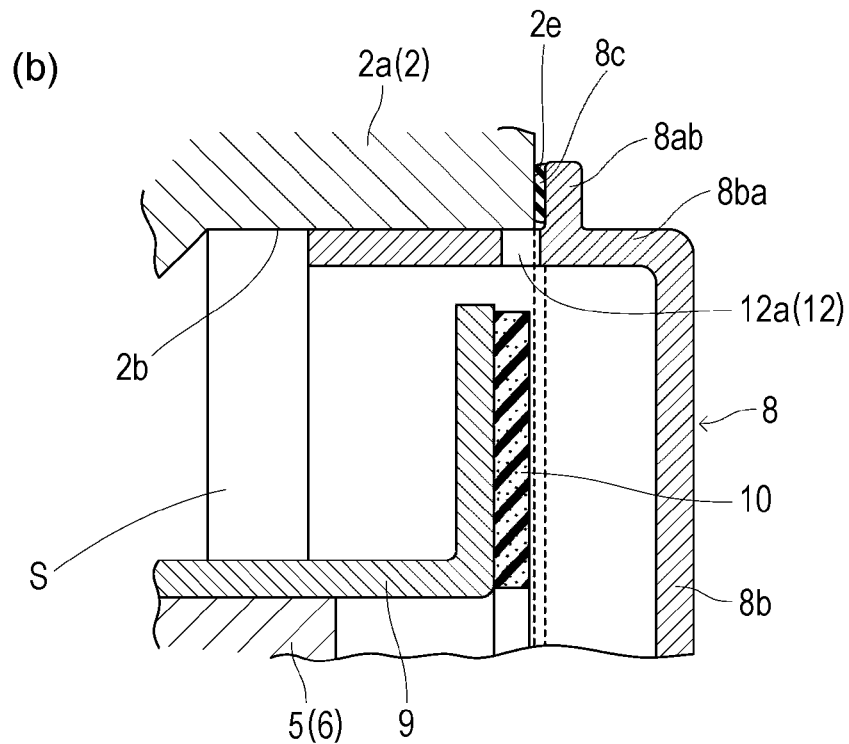

FIGS. 7(*a*) and 7(*b*) illustrate still another modification example of the first embodiment. In this example, the protective cap 8 includes the cylindrical part 8*a* and the lid part 8*b* as in the foregoing example. The cylindrical part 8*a* is integrally fitted to the inner diameter surface 2*b* of the end portion 2*a* of the outer race member 2 on the vehicle body side. The lid part 8*b* is connected to block the posterior end of cylindrical part 8*a* in the fitting direction (see hollow arrow a in FIG. 2). In addition, the annular seal part 8*c* is fixed to the cylindrical part 8*a* in the vicinity of a section connected to the lid part 8*b*, as in the examples illustrated in FIGS. 1 and 2. Meanwhile, in this example, the ventilation parts 12 are through holes 12*c*, which is different from the examples illustrated in FIGS. 1 and 2. The through holes 12*c* are formed in a portion of the cylindrical part 8a to which the annular seal part 8c is fixed so as to communicate with the annular seal part 8c and the cylindrical part 8a.

The protective cap 8 in this example is, as illustrated in FIG. 7(a) attached to the outer race member 2 so as to block the opening portion 2c of the end portion 2a on the vehicle body side by integrally fitting the cylindrical part 8a to the inner diameter surface 2b of the outer race member 2 along the direction of hollow arrow a. In the course of fitting the cylindrical part 8a to the outer race member 2, a portion of air in the bearing space S is discharged to the outside through the through holes 12a as indicated by arrow b. Therefore, in the course of fitting the cylindrical part 8a to the outer race member 2, an increase in the internal pressure of the bearing space S is suppressed to produce the same advantage as in the foregoing example. In addition, the through holes 12c are configured to communicate with the annular seal part 8c fixed to the cylindrical part 8a in the vicinity of the section connected to the lid part 8b, and the cylindrical part 8a. Thus, ventilation is assured by the through holes 12c until immediately before the annular seal part 8c reaches the predetermined fitting state (see FIG. 7(b)) where the annular seal part 8c intervenes in the compressed state between the cylindrical part 8a and the outer race member 2. In addition, when the cylindrical part 8a is fitted to the outer race member 2, the through holes 12c are blocked by the inner diameter surface 2b of the outer race member 2. Thus, the ventilation with the through holes 12c is shut down. In the state where the cylindrical part 8a is fitted to the outer race member 2, the annular seal part 8c intervenes in the compressed state between the cylindrical part 8a and the inner diameter surface 2b as in the foregoing examples. Thus, sealing is established between the cylindrical part 8a and the inner diameter surface 2b. This makes it possible to prevent entry of soil water or the like from the outside to the bearing space S and external leakage of the lubricant. In addition, it is possible to prevent damage to the magnetic encoder 10 and the like, thereby to maintain the accuracy of detection of rotation. In addition, a part of the annular seal part 8c in the compressed state resides around the through holes 12c. Thus, there is no fear that the through holes 12c bring about reduction in sealing property.

In this example, the annular seal part 8c may be configured to be wider at the section where the through holes 12c are made than other sections.

FIGS. 8(a) and 8(b) illustrate still another modification example of the first embodiment. In this example, the protective cap 8 includes the cylindrical part 8a and the lid part 8b as in the foregoing example. The cylindrical part 8a is integrally fitted to the inner diameter surface 2b of the end portion 2a of the outer race member 2 on the vehicle body side. The lid part 8b is connected to block the posterior end portion of cylindrical part 8a in the fitting direction (see hollow arrow a in FIG. 2). Meanwhile, an outward flange portion 8ab is provided at the cylindrical part 8a at the section connected to the lid part 8b. In addition, the ventilation parts 12 are formed of the through holes 12a formed in the cylindrical part 8a at a position in the vicinity of the outward flange portion 8ab. The annular seal part 8c is fixed to the outward flange portion 8ab on a surface on the anterior end side thereof in the fitting direction (direction a). In these points, this example is different from the foregoing examples. Further, in this example, the lid part 8b is connected at a (short-length) cylindrical part 8ba to an outer peripheral edge of the outward flange portion 8ab.

The protective cap 8 in this example is, as illustrated in FIG. 8(a), attached to the outer race member 2 so as to block the opening portion 2c of the end portion 2a on the vehicle body side by integrally fitting the cylindrical part 8a to the inner diameter surface 2b of the outer race member 2 along the direction of hollow arrow a. In the course of fitting the cylindrical part 8a to the outer race member 2, a portion of air in the bearing space S is discharged to the outside through the through holes 12a as indicated by arrow b. Therefore, in the course of fitting the cylindrical part 8a to the outer race member 2, an increase in the internal pressure of the bearing space S is suppressed to produce the same advantage as described above. In addition, the through holes 12a are formed in the cylindrical part 8a at a position in the vicinity of the outward flange portion 8ab. Thus, ventilation is assured by the through holes 12a until immediately before the cylindrical part 8a reaches a predetermined fitting state (see FIG. 8(b)). Therefore, as compared to the case without the through holes 12a, a virtual increase in the internal pressure of the bearing space S becomes very small. In addition, in the state where the cylindrical part 8a is fitted to the outer race member 2, the annular seal part 8c fixed to the surface of the outward flange portion 8ab on the anterior end side thereof in the fitting direction (direction a) intervenes in the compressed state between the end surface 2e of the outer race member 2 on the vehicle body side and the outward flange portion 8ab. Thus, sealing is established between the outer race member 2 and the protective cap 8. At that time, the compressed annular seal part 8c is positioned at a centrifugal side of the positions of the through holes 12a. Further, the through holes 12a are positioned in the space sealed by the annular seal part 8c. Thus, the ventilation with the through holes 12a is shut down.

FIGS. 9(a) and 9(b) illustrate another modification example of the example illustrated in FIGS. 8(a) and 8(b). In this example, the lid part 8b connected at the (short-length) cylindrical part 8ba is provided at an erected base portion of the outward flange portion 8ab similar to that in the example of FIGS. 8(a) and 8(b) with respect to the cylindrical part 8a. In this respect, this example is different from the example of FIGS. 8(a) and 8(b). Other configurations and functions of this example are the same as those in the example of FIGS. 8(a) and 8(b), and thus the same components as those in the example of FIGS. 8(a) and 8(b) are given the same reference numerals as those in the example of FIGS. 8(a) and 8(b) and descriptions thereof will be omitted.

In the example illustrated in FIGS. 8(a) and 8(b), the ventilation parts (through holes 12a) are provided at the cylindrical part 8a. Alternatively, the ventilation parts (through holes 12a) may be provided at the outward flange portion 8ab. In this case, the annular seal part 8c needs to be fixed to the outer diameter side so as to be anterior to the positions of the through holes 12a. In addition, in FIGS. 8(a) and 8(b), the gap between the magnetic encoder 10 and the lid part 8b is described in a large size. However, it is desired to provide as a smaller air gap as possible in relation to the magnetic sensor 11 illustrated in FIG. 1. Thus, in actual designing, the length of the cylindrical portion 8ba is made smaller than that in the illustrated example such that the magnetic encoder 10 and the lid part 8b come closer to each other as much as possible. Otherwise, the magnetic encoder 10 is configured to be positioned more rightward than in the illustrated example.

Figure 10:
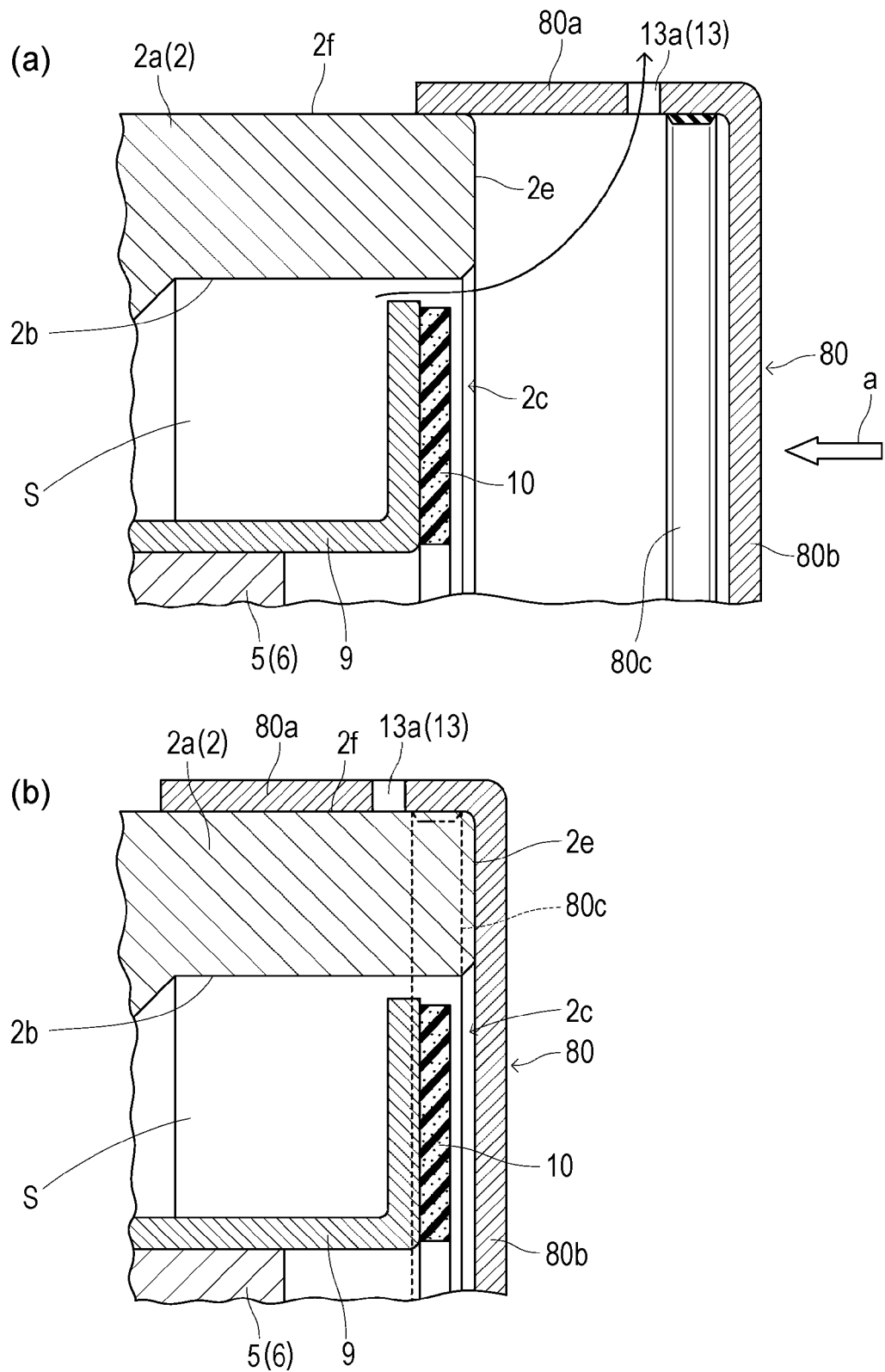
FIG. 10($a$) is a diagram similar to FIG. 2, illustrating the course of attaching a cap for bearing device according to a second embodiment of the present invention on the bearing device, and FIG. 10($b$) is a diagram equivalent to the enlarged view of FIG. 1, illustrating the state where the cap for bearing device in the same embodiment is attached to the bearing device.
Figure 11:
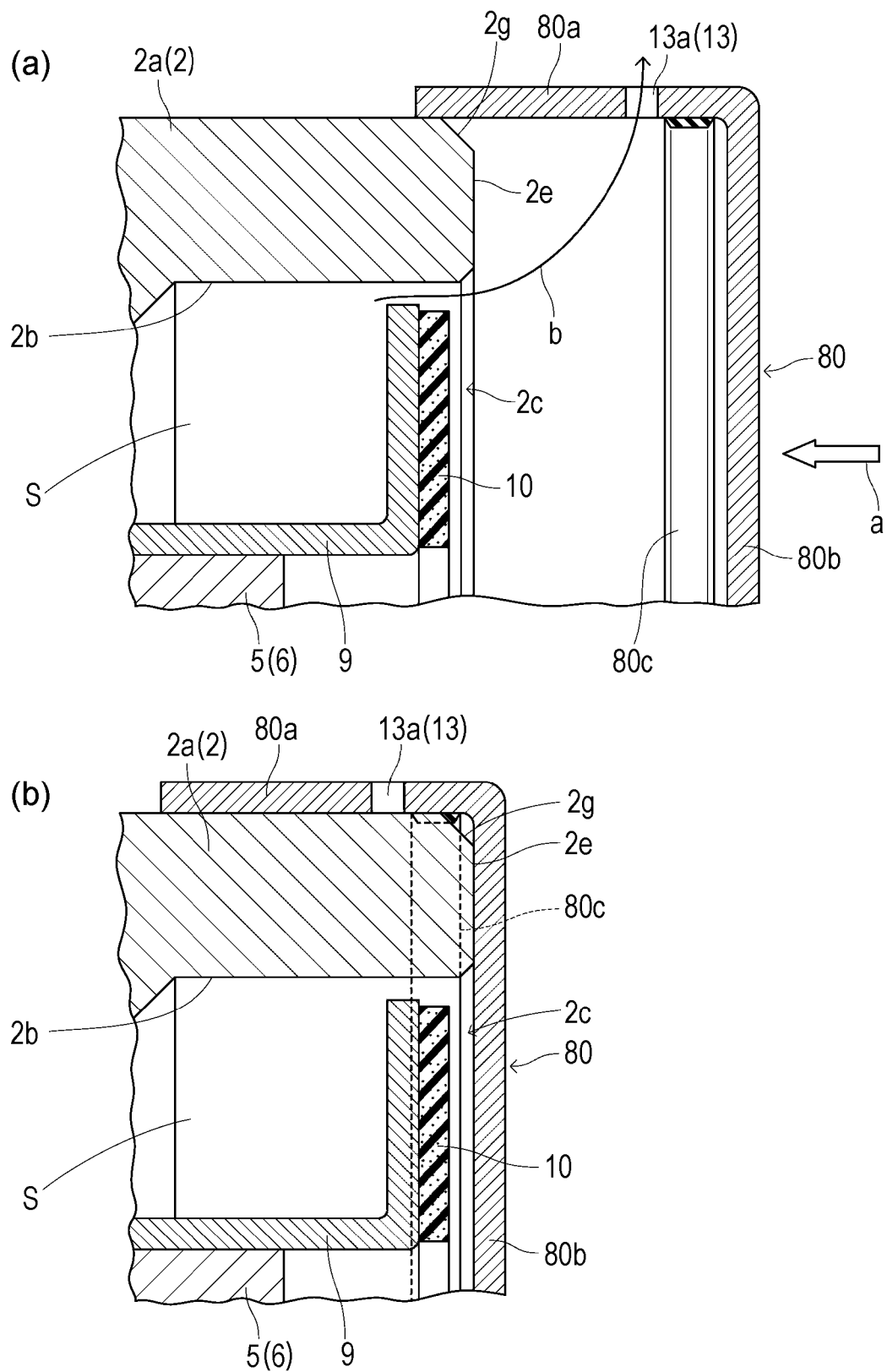
FIG. 11(a) is a diagram similar to FIG. 10(a) in a modification example of the cap for bearing device in the same embodiment.
FIG. 11(b) is a diagram equivalent to the enlarged view of FIG. 10(b), illustrating the state where the cap for bearing device in the modification example is attached to the bearing device.

FIGS. 10(a) and 10(b) illustrate a second embodiment of the cap for bearing device in the present invention, and FIGS. 11(a) to 16(b) illustrate modification examples of the same. The cap for bearing device in the first embodiment is fitted to the inner diameter surface of the outer race member. Meanwhile, the cap for bearing device in the second embodiment is fitted to the outer diameter surface of the outer race surface.

A cap for bearing device (protective cap) 80 illustrated in FIGS. 10(a) and 10(b) includes a cylindrical part 80a and a lid part 80b. The cylindrical part 80a is fitted to an outer diameter surface 2f of the end portion 2a of the outer race member 2 on the vehicle body side. The lid part 80b is connected to block the posterior end portion of the cylindrical part 80a in a fitting direction (see hollow arrow a). The protective cap 80 also includes an annular seal part 80c. The annular seal part 80c is made of a rubber material fixed to an inner peripheral surface of the cylindrical part 80a so as to intervene in a compressed state between the outer diameter surface 2f of the outer race member 2 and the cylindrical part 80a when being fitted to the outer diameter surface 2f of the outer race member 2. The annular seal part 80c is fixed to an inner peripheral surface of the cylindrical part 80a in the vicinity of a portion connected to the lid part 80b. The end portion of the bearing space S (see FIG. 1) formed by the outer race member 2 and the inner race member 6 assembled as described above on the wheel side is sealed by the seal ring 7 (see FIG. 1). Therefore, in this case, through holes 13a as ventilation parts 13 are formed in the cylindrical part 80a to suppress an increase in the internal pressure of the bearing space S together with the fitting. A plurality of (for example, four) through holes 13a is formed at equal intervals in the circumferential direction in the cylindrical part 80a in the vicinity of the anterior end thereof in the fitting direction (direction a) so as to be anterior to annular seal part 80c.

The protective cap 80 in this example is produced in the same manner as described above when is to be made of metal. The protective cap 80 is, as illustrated in FIG. 10(a), attached to the outer race member 2 so as to close the opening portion 2c of the end portion 2a on the vehicle body side by integrally fitting the cylindrical part 80a to the outer diameter surface 2f of the outer race member 2 by means of a jig not illustrated along a direction of hollow arrow a. In the course of fitting the cylindrical part 80a to the outer race member 2, a portion of air in the bearing space S is discharged to the outside through the through holes 13a as indicated by arrow b. Therefore, in the course of fitting the cylindrical part 80a to the outer race member 2, an increase in the internal pressure of the bearing space S is suppressed to produce the same advantage as described above. In addition, the through holes 13a are formed in the cylindrical part 80a at a position in the vicinity of the anterior end thereof in the fitting direction (direction a) of the annular seal part 80c. Thus, ventilation is assured by the through holes 13a until immediately before the cylindrical part 80a reaches a predetermined fitting state as illustrated in FIG. 10(a). Therefore, as compared to the case without the through holes 13a, a virtual increase in the internal pressure of the bearing space S becomes very small. In addition, in the state where the cylindrical part 80a is fitted to the outer race member 2, the annular seal part 80c fixed to the inner surface of the cylindrical part 80a intervenes in the compressed state between the cylindrical part 80a and the outer diameter surface 2f of the outer race member 2. Thus, sealing is established between the cylindrical part 80a and the outer diameter surface 2f. This makes it possible to prevent entry of soil water or the like from the outside to the bearing space S and external leakage of the lubricant. In addition, it is possible to prevent damage to the magnetic encoder 10 and the like, thereby to maintain the accuracy of detection of rotation. Further, in this embodiment, since the end portion 2a of the outer race member 2 on the vehicle body side including the end surface 2e on the vehicle body side is also protected by the protective cap 80, it is possible to prevent damage and the like to that portion. The attachment of the protective cap 80 to the outer race member 2 is performed by fitting together the metal portions in the illustrated example. Thus, if the annular seal part 80c does not exist, the sealing function of the fitting portion is not sufficient. Therefore, the annular seal part 80c as illustrated in the drawing is needed. At that time, the through holes 13a are blocked by the outer diameter surface of the outer race member 2, and thus the ventilation with the through holes 13a is shut down.

FIGS. 11(a) and 11(b) illustrate a modification example of the second embodiment. In this example, the protective cap 80 includes the cylindrical part 80a and the lid part 80b as in the foregoing example. The cylindrical part 80a is integrally fitted to the outer diameter surface 2f of the end portion 2a of the outer race member 2 on the vehicle body side. The lid part 80b is connected to block the posterior end portion of the cylindrical part 80a in the fitting direction (direction of hollow arrow a). In addition, as in the foregoing example, the annular seal part 80c made of a rubber material is fixed to an inner peripheral surface of the cylindrical part 80a at almost the same position as in the foregoing example. In this example, a corner part of the outer race member 2 between the outer diameter surface 2f and the end surface 2e on the vehicle body side is set as chamfered corner part 2g. In the state where the cylindrical part 80a is fitted to the outer race member 2, the annular seal part 80c is configured to intervene in the compressed state between the inner surface of the cylindrical part 80a and the outer diameter surface 2f and to be partially positioned in a space between the chamfered corner part 2g and the lid part 80b. By such a space between the chamfered corner part 2g and the lid part 80b, an escape portion is provided for the annular seal part 80c. Thus, the fitting of the annular seal part 80c with compression is smoothly performed with a small resistance. This example is the same as the example of FIGS. 10(a) and 10(b) in: the internal pressure of the bearing space S suppressed by ventilation through the through holes 13a in the course of fitting the cylindrical part 80a to the outer race member 2; the advantages of the suppressed internal pressure; and the advantages of the annular seal part 80c in the state where the cylindrical part 80a is fitted to the outer race member 2, and thus descriptions thereof will be omitted.

In the examples illustrated in FIGS. 10(a) and 10(b) and FIGS. 11(a) and 11(b), by disposing the annular seal part 80c slightly anterior to one in the illustrated example in the fitting direction (direction a), the annular seal part 80c may be configured to detour the posterior end in the fitting direction (direction a) at the positions of the through holes 13a.

FIGS. 12(a) and 12(b) illustrate another modification example of the second embodiment. In this example, the protective cap 80 also includes the cylindrical part 80a and the lid part 80b. The cylindrical part 80a is integrally fitted to the outer diameter surface 2f of the end portion 2a of the outer race member 2 on the vehicle body side. The lid part 80b is connected to block the posterior end portion of the cylindrical part 80a in the fitting direction (direction of hollow arrow a). In addition, the through holes 13a as ventilation parts 13 are formed in the cylindrical part 80a in the vicinity of the lid part 80b. Further, the annular seal part 80c is fixed to the inner surface of the lid part 80b at a position opposed to the end surface 2e of the outer race member 2 on the vehicle body side.

Figure 12:
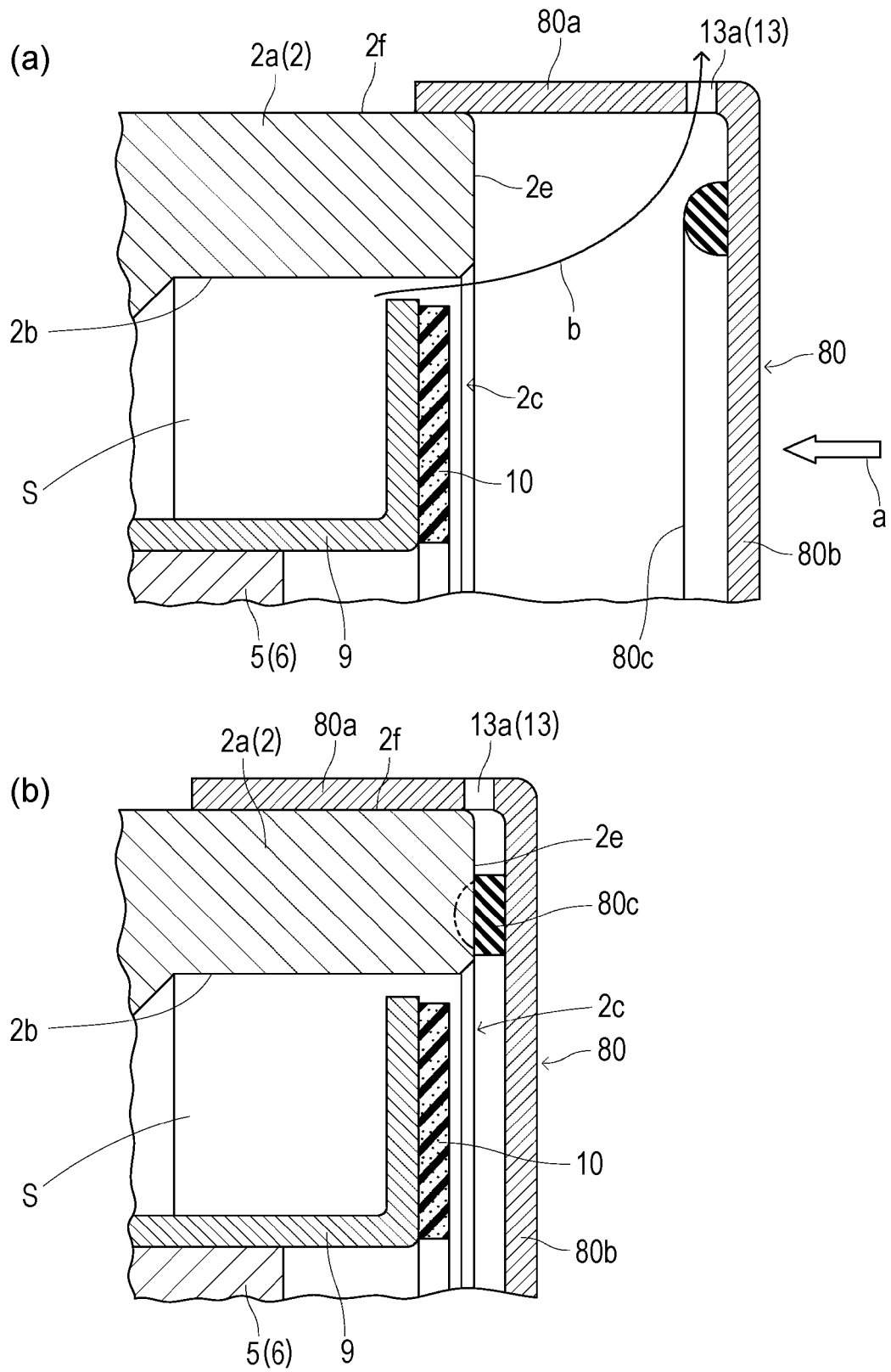
FIG. 12(a) is a diagram similar to FIG. 10(a) in another modification example of the cap for bearing device in the same embodiment.
FIG. 12(b) is a diagram equivalent to the enlarged view of FIG. 10(b), illustrating the state where the cap for bearing device in the modification example is attached to the bearing device.

The protective cap 80 in this example is also attached to the outer race member 2 so as to block the opening portion 2c of the end portion 2a on the vehicle body side by integrally fitting the cylindrical part 80a to the outer diameter surface 2f of the outer race member 2. In the course of fitting the cylindrical part 80a to the outer race member 2, a portion of air in the bearing space S is discharged to the outside through the through holes 13a as indicated by arrow b. Therefore, in the course of fitting the cylindrical part 8a to the outer race member 2, an increase in the internal pressure of the bearing space S is suppressed to produce the same advantage as described above. In addition, the through holes 13*a* are formed in the cylindrical part 80*a* at a position in the vicinity of the lid part 80*b*. Thus, ventilation is assured by the through holes 13*a* until immediately before the cylindrical part 80*a* reaches a predetermined fitting state as illustrated in FIG. 12(*b*). Therefore, as compared to the case without the through holes 13*a*, a virtual increase in the internal pressure of the bearing space S becomes very small. In addition, in the state where the cylindrical part 80*a* is fitted to the outer race member 2, the annular seal part 80*c* fixed to the inner surface of the lid part 80*b* intervenes in the compressed state between the end surface 2*e* of the outer race member 2 on the vehicle body side and the lid part 80*b*. Therefore, sealing is established between the lid part 80*b* and the end surface 2*e* on the vehicle body side. This makes it possible to prevent entry of soil water or the like from the outside to the bearing space S and external leakage of the lubricant. In addition, it is possible to prevent damage to the magnetic encoder 10 and the like, thereby to maintain the accuracy of detection of rotation. At that time, the through holes 13*a* are positioned at a centrifugal side of the annular seal part 80*c* that intervenes in the compressed state between the end surface 2*e* on the vehicle body side and the lid part 80*b*. Thus, the ventilation with the through holes 13*a* is shut down.

Figure 13:
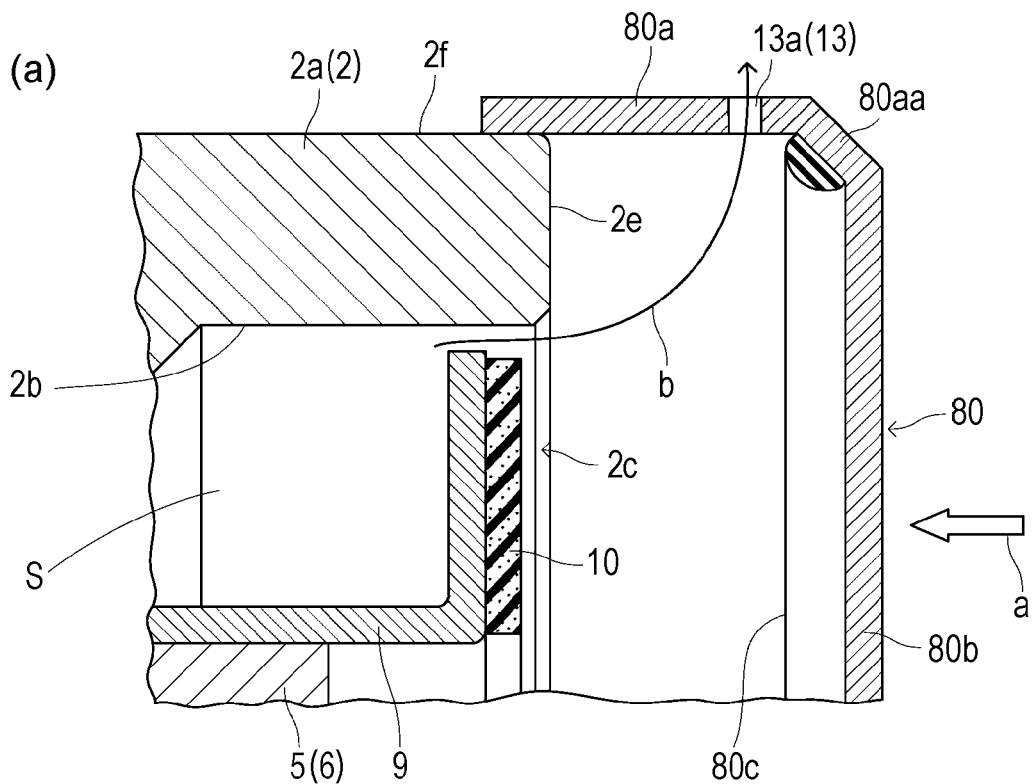
FIG. 13(a) is a diagram similar to FIG. 10(a) in still another modification example of the cap for bearing device in the same embodiment.
FIG. 13(b) is a diagram equivalent to the enlarged view of FIG. 10(b), illustrating the state where the cap for bearing device in the modification example is attached to the bearing device.
Figure 13:
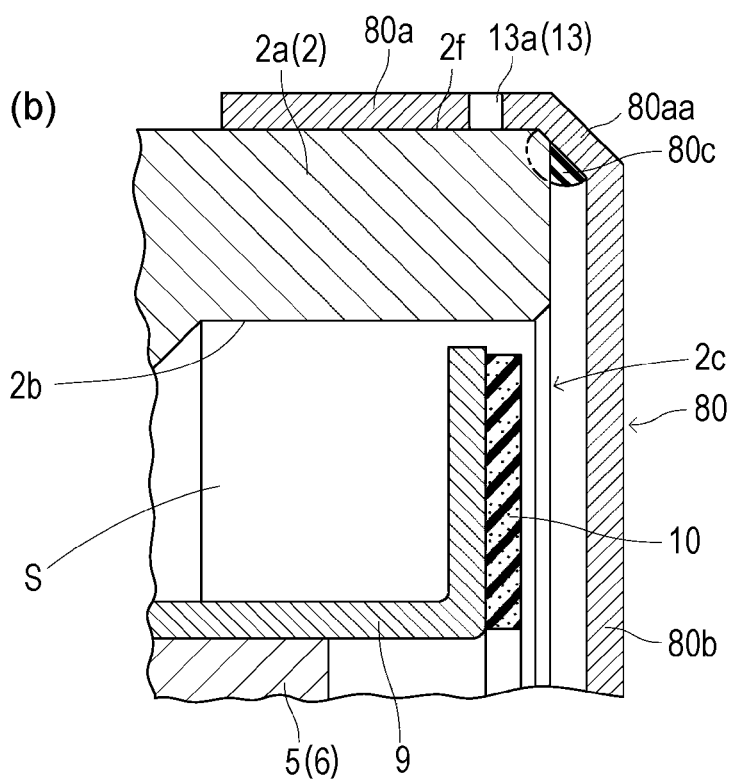

FIGS. 13(*a*) and 13(*b*) illustrate a still another modification example of the second embodiment. In this example, the protective cap 80 also includes the cylindrical part 80*a* and the lid part 80*b*. The cylindrical part 80*a* is fitted to the outer diameter surface 2*f* of the end portion 2*a* of the outer race member 2 on the vehicle body side. The lid part 80*b* is connected to block the posterior end portion of the cylindrical part 80*a* in the fitting direction (direction of hollow arrow a). In this case, the posterior end portion of the cylindrical part 80*a* in the fitting direction (direction of hollow arrow a) has a tapered portion 80*aa* that gradually reduces in diameter on the lid part 80*b*. The lid part 80*b* is connected to the tapered portion 80*aa*. In addition, the through holes 13*a* as ventilation parts 13 are formed in the cylindrical part 80*a* at a position in the vicinity of the tapered portion 80*aa*. Further, the annular seal part 80*c* is fixed to the inner surface of the tapered portion 80*aa*.

The protective cap 80 in this example is also attached to the outer race member 2 so as to block the opening portion 2*c* of the end portion 2*a* on the vehicle body side by integrally fitting the cylindrical part 80*a* to the outer diameter surface 2*f* of the outer race member 2. In the course of fitting the cylindrical part 80*a* to the outer race member 2, a portion of air in the bearing space S is discharged to the outside through the through holes 13*a* as indicated by arrow b. Therefore, in the course of fitting the cylindrical part 80*a* to the outer race member 2, an increase in the internal pressure of the bearing space S is suppressed to produce the same advantage as described above. In addition, the through holes 13*a* are formed in the cylindrical part 80*a* at a position in the vicinity of the tapered portion 80*aa*. Thus, ventilation is assured by the through holes 13*a* until immediately before the cylindrical part 80*a* reaches a predetermined fitting state as illustrated in FIG. 13(*b*). Therefore, as compared to the case without the through holes 13*a*, a virtual increase in the internal pressure of the bearing space S becomes very small. In addition, in the state where the cylindrical part 80*a* is fitted to the outer race member 2, the annular seal part 80*c* fixed to the inner surface of the tapered portion 80*aa* intervenes in the compressed state between the end surface 2*e* of the outer race member 2 on the vehicle body side and the tapered portion 80*aa*. Therefore, sealing is established between the tapered portion 80*aa* and the end surface 2*e* on the vehicle body side. This makes it possible to prevent entry of soil water or the like from the outside to the bearing space S and external leakage of the lubricant. In addition, it is possible to prevent damage to the magnetic encoder 10 and the like, thereby to maintain the accuracy of detection of rotation. At that time, the through holes 13*a* are blocked by the outer diameter surface 2*f*. Further, the annular seal part 80*c* intervenes in the compressed state between the end surface 2*e* on the vehicle body side and the tapered portion 80*aa*. Thus, the ventilation with the through holes 13*a* is shut down.

Figure 14:
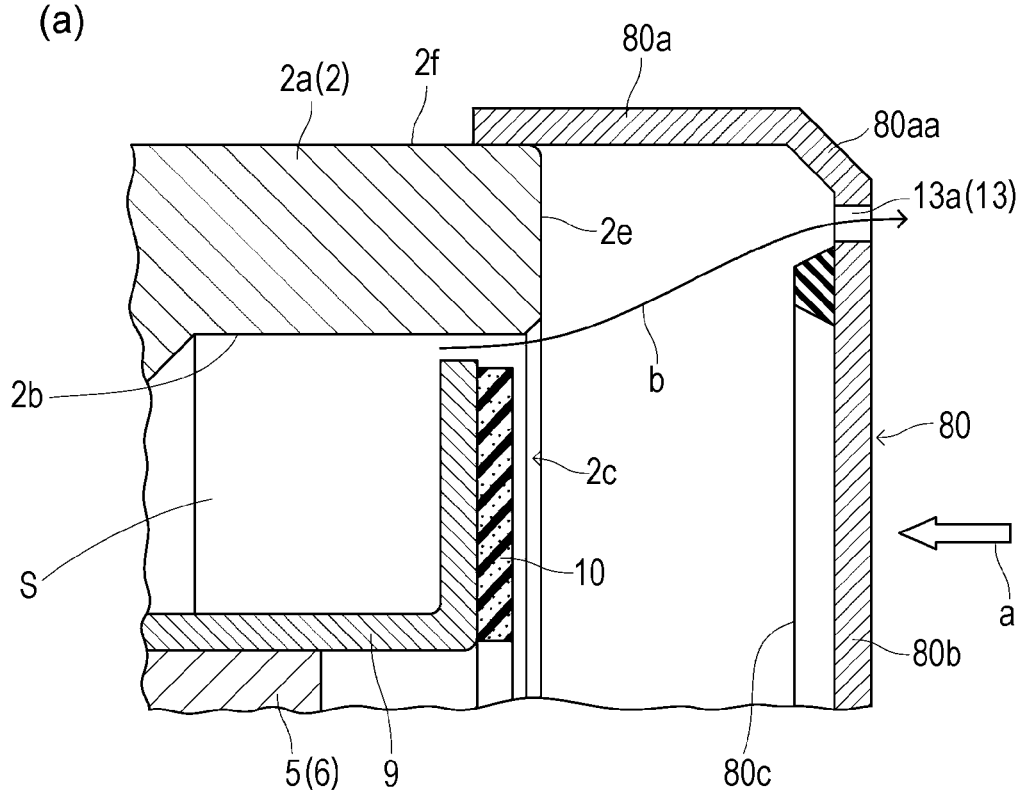
FIG. 14(a) is a diagram similar to FIG. 10(a) in still another modification example of the cap for bearing device in the same embodiment.
FIG. 14(b) is a diagram equivalent to the enlarged view of FIG. 10(b), illustrating the state where the cap for bearing device in the modification example is attached to the bearing device.
Figure 14:
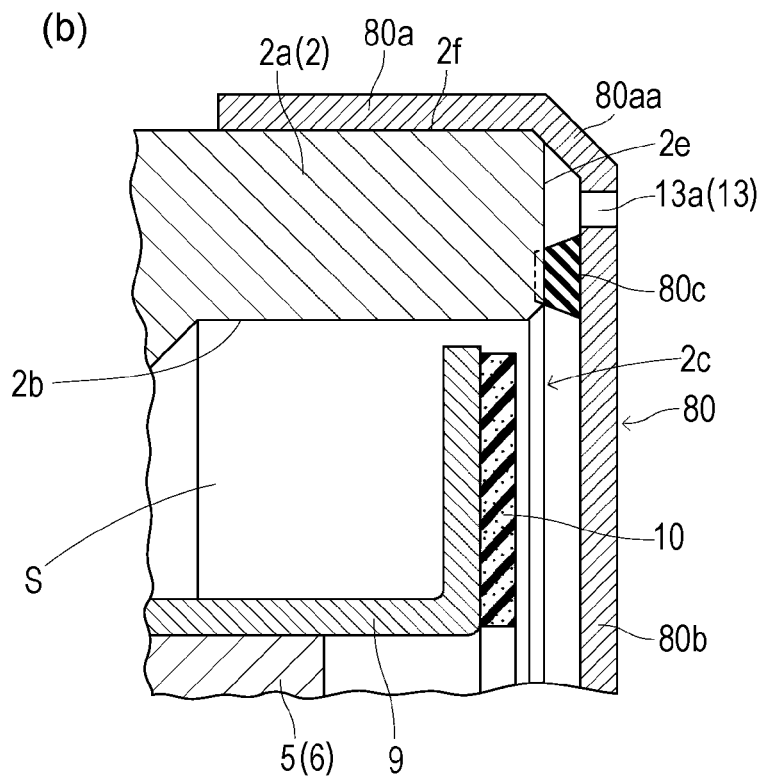
Figure 15:
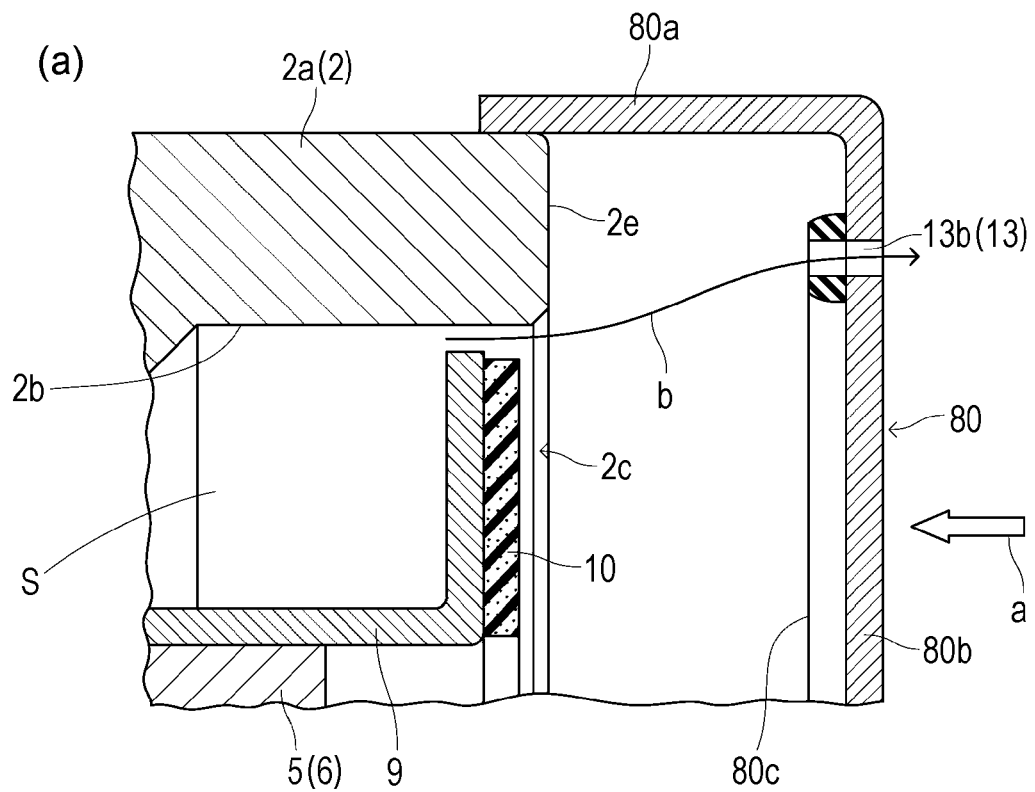
FIG. 15(a) is a diagram similar to FIG. 10(a) in still another modification example of the cap for bearing device in the same embodiment.
FIG. 15(b) is a diagram equivalent to the enlarged view of FIG. 10(b), illustrating the state where the cap for bearing device in the modification example is attached to the bearing device.
Figure 15:
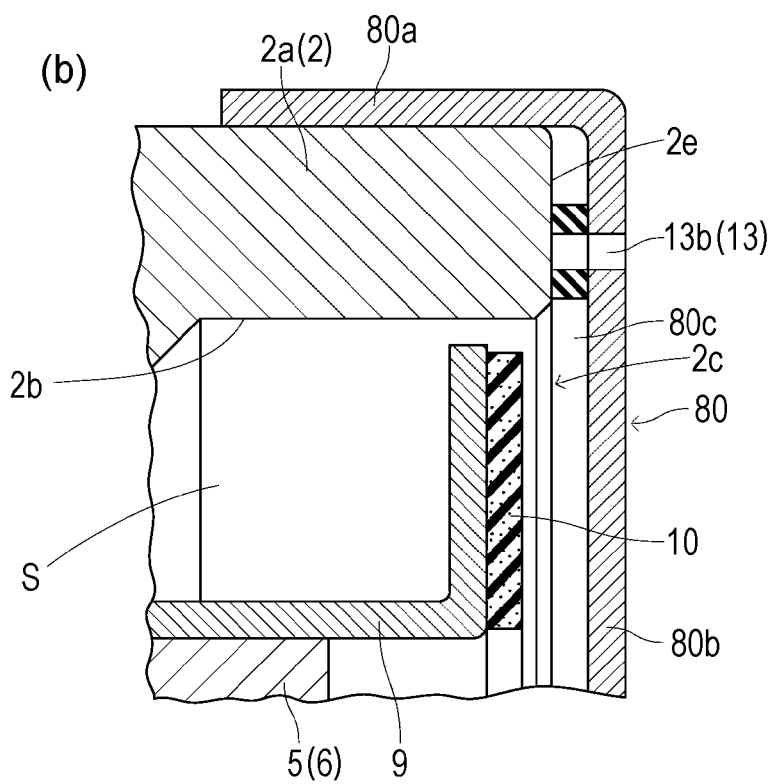
Figure 16:
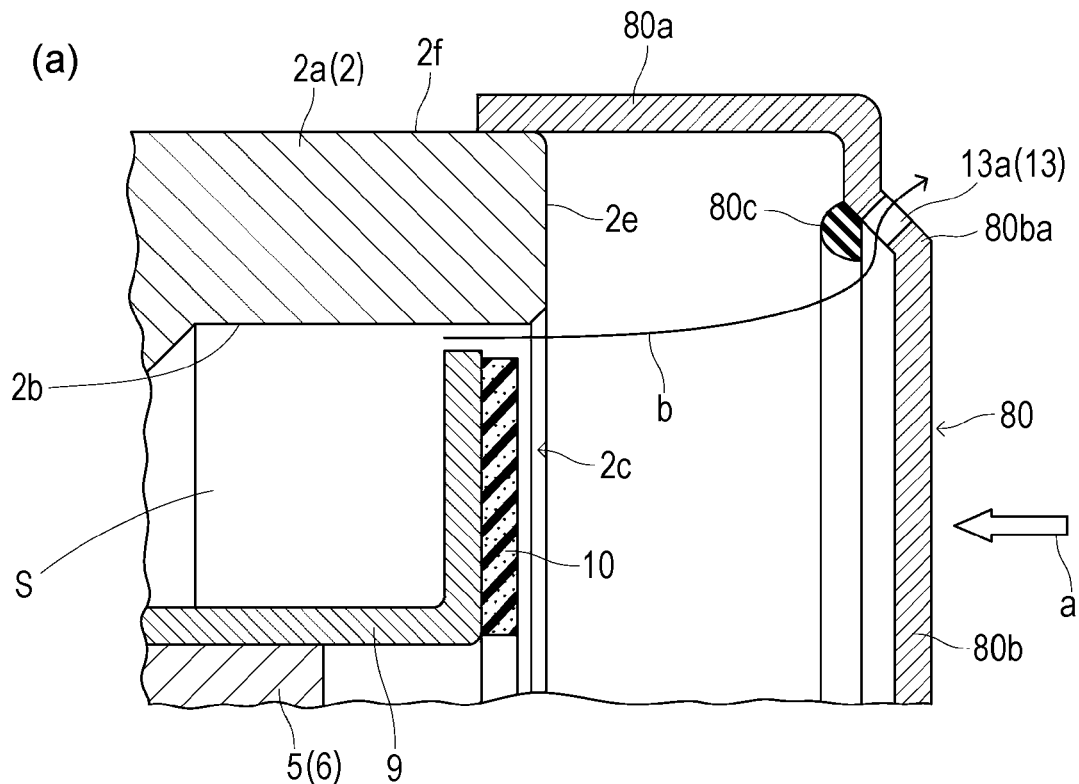
FIG. 16(a) is a diagram similar to FIG. 10(a) in still another modification example of the cap for bearing device in the same embodiment.
FIG. 16(b) is a diagram equivalent to the enlarged view of FIG. 10(b), illustrating the state where the cap for bearing device in the modification example is attached to the bearing device.
Figure 16:
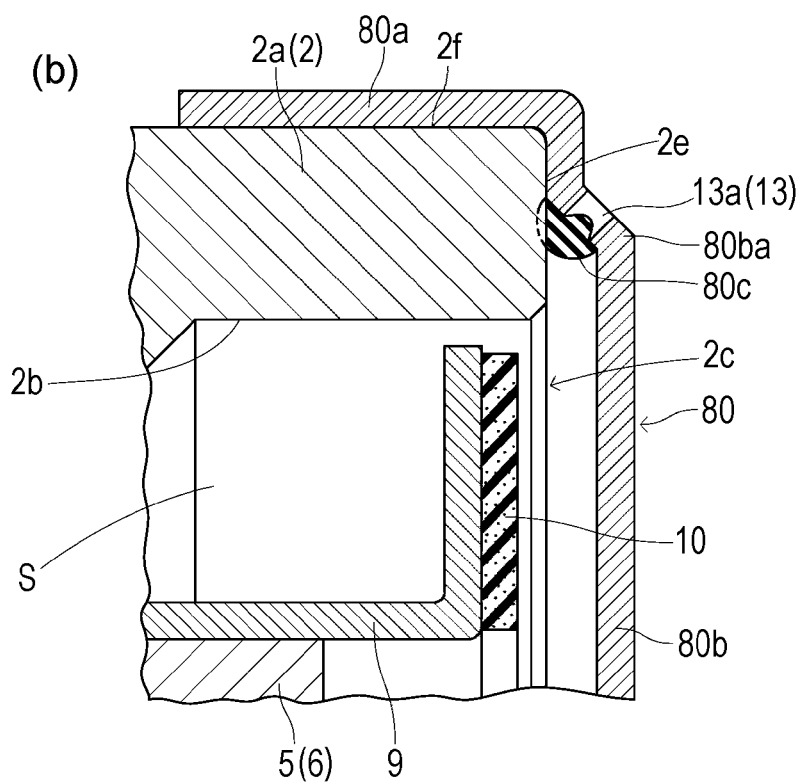

FIGS. 14(*a*) and 14(*b*) illustrate a still another modification example of the second embodiment. In this example, the protective cap 80 also includes the cylindrical part 80*a* and the lid part 80*b*. The cylindrical part 80*a* is fitted to the outer diameter surface 2*f* of the end portion 2*a* of the outer race member 2 on the vehicle body side. The lid part 80*b* is connected to block the posterior end portion of the cylindrical part 80*a* in the fitting direction (direction of hollow arrow a). In this case, as the example of the FIGS. 13(*a*) and 13(*b*), the posterior end portion of the cylindrical part 80*a* in the fitting direction (direction of hollow arrow a) has the tapered portion 80*aa* that gradually reduces in diameter on the lid part 80*b*. The lid part 80*b* is connected to the tapered portion 80*aa*. In addition, the through holes 13*a* as ventilation parts 13 are formed in the lid part 80*b* at a position in the vicinity of the tapered portion 80*aa*. Further, the annular seal part 80*c* is fixed to the inner surface of the lid part 80*b* at the centripetal side of the positions of the through holes 13*a* at a position opposed to the end surface 2*e* of the outer race member 2 on the vehicle body side.

The protective cap 80 in this example is also attached to the outer race member 2 so as to block the opening portion 2*c* of the end portion 2*a* on the vehicle body side by integrally fitting the cylindrical part 80*a* to the outer diameter surface 2*f* of the outer race member 2. In the course of fitting the cylindrical part 80*a* to the outer race member 2, a portion of air in the bearing space S is discharged to the outside through the through holes 13*a* as indicated by arrow b. Therefore, in the course of fitting the cylindrical part 80*a* to the outer race member 2, an increase in the internal pressure of the bearing space S is suppressed to produce the same advantage as described above. In addition, the through holes 13*a* are formed in the lid part 80*b*. Thus, ventilation is assured by the through holes 13*a* until immediately before the annular seal part 80*c* reaches a predetermined fitting state where the annular seal part 80*c* intervenes in the compressed state between the end surface 2*e* on the vehicle body side and the lid part 80*b*, as illustrated in FIG. 14(*b*). Therefore, as compared to the case without the through holes 13*a*, a virtual increase in the internal pressure of the bearing space S becomes very small. In addition, in the state where the cylindrical part 80*a* is fitted to the outer race member 2, the annular seal part 80*c* intervenes in the compressed state between the end surface 2*e* of the outer race member 2 on the vehicle body side and the tapered portion 80*aa*. Thus, sealing is established between the lid part 80*b* and the end surface 2*e* on the vehicle body side. This makes it possible to prevent entry of soil water or the like from the outside to the bearing space S and external leakage of the lubricant. In addition, it is possible to prevent damage to the magnetic encoder 10 and the like, thereby to maintain the accuracy of detection of rotation. At that time, the through holes 13*a* are positioned at a centrifugal side of the annular seal part 80*c* that intervenes in the compressed state between the end surface 2*e* on the vehicle body side and the tapered portion 80*aa*. Thus, the ventilation with the through holes 13*a* is shut down.

In this example, by forming the annular seal part 80c at a little further centrifugal side than that in the illustrated example, the annular seal part 80c may be configured to detour the centripetal side of the through holes 13a at the positions of the through holes 13a.

FIGS. 15(a) and 15(b) illustrate a still another modification example of the second embodiment. In this example, the protective cap 80 also includes the cylindrical part 80a and the lid part 80b. The cylindrical part 80a is fitted to the outer diameter surface 2f of the end portion 2a of the outer race member 2 on the vehicle body side. The lid part 80b is connected to block the posterior end portion of the cylindrical part 80a in the fitting direction (direction of hollow arrow a). In this case, the annular seal part 80c is fixed to the inner surface of the lid part 80b at a position opposed to the end surface 2e of the outer race member 2 on the vehicle body side. In addition, the ventilation parts 13 are formed of through holes 13b that are formed to communicate with the annular seal part 80c and the lid part 80b.

The protective cap 80 in this example is also attached to the outer race member 2 so as to block the opening portion 2c of the end portion 2a on the vehicle body side by integrally fitting the cylindrical part 80a to the outer diameter surface 2f of the outer race member 2. In the course of fitting the cylindrical part 80a to the outer race member 2, a portion of air in the bearing space S is discharged to the outside through the through holes 13b as indicated by arrow b. Therefore, in the course of fitting the cylindrical part 80a to the outer race member 2, an increase in the internal pressure of the bearing space S is suppressed to produce the same advantage as described above. In addition, the through holes 13b are formed to communicate with the lid part 80b and the annular seal part 80c fixed to the inner surface of the lid part 80b. Thus, ventilation is assured by the through holes 13b until immediately before the annular seal part 80c reaches a predetermined fitting state where the annular seal part 80c intervenes in the compressed state between the end surface 2e on the vehicle body side and the lid part 80b, as illustrated in FIG. 15(b). Therefore, as compared to the case without the through holes 13b, a virtual increase in the internal pressure of the bearing space S becomes very small. In addition, in the state where the cylindrical part 80a is fitted to the outer race member 2, the annular seal part 80c intervenes in the compressed state between the end surface 2e of the outer race member 2 on the vehicle body side and the tapered portion 80aa. Thus, sealing is established between the lid part 80b and the end surface 2e on the vehicle body side. This makes it possible to prevent entry of soil water or the like from the outside to the bearing space S and external leakage of the lubricant. In addition, it is possible to prevent damage to the magnetic encoder 10 and the like, thereby to maintain the accuracy of detection of rotation. At that time, the through holes 13b are formed to communicate with the annular seal part 80c and the lid part 80b. Therefore, the surroundings of the through holes 13b are blocked by the annular seal part 80c that intervenes in the compressed state between the end surface 2e on the vehicle body side and the tapered portion 80aa. Thus, the ventilation with the through holes 13b is shut down.

In this example, the annular seal part 80c may be configured to be wider at the section where the through holes 13b are made than other sections.

FIGS. 15(a) and 15(b) illustrate a still another modification example of the second embodiment. In this example, the protective cap 80 also includes the cylindrical part 80a and the lid part 80b. The cylindrical part 80a is fitted to the outer diameter surface 2f of the end portion 2a of the outer race member 2 on the vehicle body side. The lid part 80b is connected to block the posterior end portion of the cylindrical part 80a in the fitting direction (direction of hollow arrow a). In this case, the lid part 80b has a tapered portion 80ba that gradually reduces in diameter on the vehicle body side at a position opposed to the end surface 2e of the outer race member 2 on the vehicle body side. The ventilation parts 13 are formed of through holes 13a in the tapered portion 80e. In addition, a portion of the annular seal part 80c is fixed to the inner surface of the tapered portion 80ba at a section in the cylindrical part 80a side in the vicinity of the positions of the through holes 13a. Further, before the cylindrical part 80a is fitted and compressed to the outer race member 2, the annular seal part 80c is formed to cover the opening portions of the through holes 13a while leaving a gap for ventilation, as illustrated in FIG. 16(a).

The protective cap 80 in this example is also attached to the outer race member 2 so as to block the opening portion 2c of the end portion 2a on the vehicle body side by integrally fitting the cylindrical part 80a to the outer diameter surface 2f of the outer race member 2. In the course of fitting the cylindrical part 80a to the outer race member 2, a portion of air in the bearing space S is discharged to the outside through the through holes 13b as indicated by arrow b. Therefore, in the course of fitting the cylindrical part 80a to the outer race member 2, an increase in the internal pressure of the bearing space S is suppressed to produce the same advantage as described above. In addition, the through holes 13a are formed in the tapered portion 80ba of the lid part 80b. Thus, ventilation is assured by the through holes 13a until immediately before the annular seal part 80c reaches a predetermined fitting state where the annular seal part 80c intervenes in the compressed state between the end surface 2e on the vehicle body side and the lid part 80b, as illustrated in FIG. 16(b). Therefore, as compared to the case without the through holes 13a, a virtual increase in the internal pressure of the bearing space S becomes very small. In addition, in the state where the cylindrical part 80a is fitted to the outer race member 2, the annular seal part 80c is compressed between the end surface 2e of the outer race member 2 on the vehicle body side and the tapered portion 80ba, and elastically deformed to intervene in the state to block the through holes 13a. Thus, sealing is established between the lid part 80b and the end surface 2e on the vehicle body side. This makes it possible to prevent entry of soil water or the like from the outside to the bearing space S and external leakage of the lubricant. In addition, it is possible to prevent damage to the magnetic encoder 10 and the like, thereby to maintain the accuracy of detection of rotation. At that time, the opening portions of the through holes 13a are blocked by the elastically deformed annular seal part 80c. Thus, the ventilation with the through holes 13a is shut down.

In addition, in this example, a portion of the annular seal part 80c is fixed to a section in the cylindrical part 80a side in the vicinity of the positions of the through holes 13a. However, the annular seal part 80c is not limited to this, and a portion of the annular seal part 80c may be fixed to any section around the through holes 13a.

In the examples illustrated in FIGS. 10(a) to 13(b) of the second embodiment, the ventilation parts may be, instead of the through holes 13a, slit-like notches that extend from the anterior end portion to the posterior end portion of the cylindrical part 80a in the fitting direction (direction a) as illustrated in FIG. 3. In each of the embodiments, a plurality of ventilation parts 12 or 13 is provided. Alternatively, the number of the ventilation part may be one. Further, the cap for bearing device in the present invention is applied to the bearing device 1 including the magnetic encoder 10. Alternatively, the cap for bearing device in the present invention is not limited to this but may be attached to an outer race member in a bearing device without a magnetic encoder. In this case, it is considered that constitutional material for the cap for bearing device may be any other material other than non-magnetic materials. In addition, the cap for bearing device in the present invention can be applied to not only a hub bearing as exemplified above but also any other bearing device that has an opening portion of one end portion of an outer race member needed to be blocked. Further, the entire shapes of the protective caps 8 and 80 (lengths of the cylindrical part 8a and 80a, shapes of the lid parts 8b and 80b, and the like), cross-sectional shapes of the annular seal parts 8c and 80c, and the like can be changed as appropriate to shapes other than the exemplified ones, as design matters.

DESCRIPTION OF REFERENCE SIGNS

1 Hub bearing (bearing device)
2 Outer race member
2a End portion (one end portion) of outer race member on vehicle body side
2b Inner diameter surface of outer race member
2c Opening portion of outer race member
2e End surface of outer race member on vehicle body side (end surface at one end portion side)
2f Outer diameter surface of outer race member
8, 80 Protective cap (cap for bearing device)
8a, 80a Cylindrical part
8b, 80b Lid part
8c, 80c Annular seal part
8e Outward flange portion
12, 13 Ventilation part
12a, 13a Through hole
12b Notch
12c, 13b Through hole
a Fitting direction
S Bearing space

The invention claimed is:

1. A bearing device comprising an outer race member and a cap, the cap being attached to one axial end portion of the outer race member to block an opening portion of the one end portion, the cap comprising:
  a cylindrical part that is fitted to the outer race member;
  a lid part configured to connect to block a posterior end portion of the cylindrical part in a fitting direction;
  an annular seal part that is in direct contact with and fixed to an inner surface of the cap, the annular seal part being configured to, when the cap is fitted to the outer race member, intervene in a compressed state between the inner surface of the cap and the outer race member; and
  a ventilation part, wherein
  in the course of fitting the cylindrical part to the outer race member, the ventilation part allows air to pass between inside and outside of a bearing space, and
  in the state where the cylindrical part is fitted to the outer race member, the ventilation of the ventilation part is shut down by the annular seal part.

2. The bearing device according to claim 1, wherein
  the inner surface of the cap comprises an inner peripheral surface of the cylindrical part and an inner surface of the lid part;
  when the cap is fitted to the outer race member, the inner peripheral surface of the cylindrical part is in direct contact with an outer diameter surface of the outer race member.

3. The bearing device according to claim 1, wherein
  the ventilation part is formed of a through hole formed in the cylindrical part,
  the through hole is positioned anterior to the annular seal part in the cylindrical part in the fitting direction, and
  the annular seal part is configured to, in the state where the cylindrical part is fitted to the outer race member, intervene in the compressed state between the outer race member and the cylindrical part.

4. The bearing device according to claim 1, wherein
  the ventilation part is formed of a notch extending from an anterior end portion of the cylindrical part in the fitting direction to the posterior end of the cylindrical part in the fitting direction,
  the notch is positioned anterior to the annular seal part in the cylindrical part in the fitting direction thereof, and
  the annular seal part is configured to, in the state where the cylindrical part is fitted to the outer race member, intervene in the compressed state between the outer race member and the cylindrical part.

5. The bearing device according to claim 2, wherein
  the ventilation part is formed of a through hole formed in the cylindrical part,
  the annular seal part is fixed to the inner surface of the lid part, and
  the annular seal part is configured to, in the state where the cylindrical part is fitted to the outer race member, intervene in the compressed state between the end surface of the outer race member on the one end portion side and the lid part.

6. The bearing device according to claim 2, wherein
  the ventilation part is formed of a through hole formed in the lid part,
  the annular seal part is fixed to the inner surface of the lid part,
  the through hole is positioned at a centrifugal side of the annular seal part, and
  the annular seal part is configured to, in the state where the cylindrical part is fitted to the outer race member, intervene in the compressed state between the end surface of the outer race member and the lid part.

7. The bearing device according to claim 2, wherein
  the annular seal part is fixed to the inner surface of the lid part,
  the ventilation part is formed of a through hole formed in the lid part at a section to which the annular seal part is fixed so as to communicate with the annular seal part and the lid part, and
  the annular seal part is configured to, in the state where the cylindrical part is fitted to the outer race member, intervene in the compressed state between the end surface of the outer race member and the lid part.

8. The bearing device according to claim 2, wherein
  a portion of the annular seal part is fixed to the inner surface of the lid part,
  the ventilation part is formed of a through hole formed in the lid part in the vicinity of the fixed portion of the annular seal part, and
  the annular seal part is configured to, in the state where the cylindrical part is fitted to the outer race member, intervene in the compressed state between the end surface of the outer race member and the lid part to block the through hole.

9. The bearing device according to claim 2, wherein
  the ventilation part is formed of a through hole formed in the cylindrical part,
  the annular seal part is fixed to the inner peripheral surface of the cylindrical part, the through hole is positioned anterior to the annular seal part in the cylindrical part in the fitting direction, and the annular seal part is configured to, in the state where the cylindrical part is fitted to the outer race member, intervene in the compressed state between the outer diameter surface of the outer race member and the cylindrical part.

10. The bearing device according to claim 2, wherein the ventilation part is formed of a notch extending from an anterior end portion of the cylindrical part in the fitting direction to the posterior end of the cylindrical part in the fitting direction, the notch is positioned anterior to the annular seal part in the cylindrical part in the fitting direction thereof, and the annular seal part is configured to, in the state where the cylindrical part is fitted to the outer race member, intervene in the compressed state between the outer race member and the cylindrical part.

11. The bearing device according to claim 1, further comprising:

an inner race member inside the cap;

a support ring that is integrally fitted and attached to an outer diameter surface of the inner race member, and a magnetic encoder that is fixed to a surface of the support ring facing to the lid part.

12. The bearing device according to claim 1, wherein the annular seal part is fixed to the inner surface of the cap by vulcanized forming.

13. The bearing device according to claim 2, wherein when the cap is fitted to the outer race member, the outer diameter surface of the one axial end portion of the outer race member is in parallel with and surrounded by the inner peripheral surface of the cylindrical part.

* * * * *